(12) United States Patent
Sul et al.

(10) Patent No.: US 7,698,088 B2
(45) Date of Patent: Apr. 13, 2010

(54) INTERFACE TEST CIRCUITRY AND METHODS

(75) Inventors: Chinsong Sul, Mountain View, CA (US);
Heon C. Kim, San Jose, CA (US);
Gijung Ahn, San Jose, CA (US)

(73) Assignee: Silicon Image, Inc., Sunnyvale, CA (US)

(*) Notice: Subject to any disclaimer, the term of this patent is extended or adjusted under 35 U.S.C. 154(b) by 0 days.

(21) Appl. No.: 11/742,358

(22) Filed: Apr. 30, 2007

(65) Prior Publication Data
US 2008/0114562 A1    May 15, 2008

Related U.S. Application Data

(60) Provisional application No. 60/859,355, filed on Nov. 15, 2006.

(51) Int. Cl.
*G06F 3/01* (2006.01)
(52) U.S. Cl. .................. 702/122; 702/116; 702/117; 702/123
(58) Field of Classification Search ............ 702/57, 702/60, 117, 119, 182, 187, 188; 380/268; 375/141; 725/62; 348/473; 382/232; 282/232
See application file for complete search history.

(56) References Cited

U.S. PATENT DOCUMENTS

| | | | | |
|---|---|---|---|---|
| 6,914,637 | B1 * | 7/2005 | Wolf et al. | 348/473 |
| 6,985,467 | B2 * | 1/2006 | Lomp et al. | 370/335 |
| 2003/0189903 | A1 | 10/2003 | Hsu et al. | |
| 2003/0190078 | A1 * | 10/2003 | Govindaswamy et al. | 382/232 |

OTHER PUBLICATIONS

"8029P014EP Search Report Mailed Apr. 8, 2008 for EP Patent Application 07254313.5", (Apr. 8, 2008), Whole Document.
Barker, Jr., Charles R., "Intermediate Level Maintenance Fibre Channel Testing", *2002 IEEE*, (2002), 509-530.
Sunter, Stephen, et al., "Structural Tests for Jitter Tolerance in Serdes Receivers", *2006 IEEE*, Best Paper International Test Conference, (2006), Whole Document.
EP Examination Report for EP application No. 07 254 313.5-2216 mailed Jun. 5, 2009, 2 pages.

* cited by examiner

*Primary Examiner*—Eliseo Ramos Feliciano
*Assistant Examiner*—Felix E Suarez
(74) *Attorney, Agent, or Firm*—Blakely Sokoloff Taylor & Zafman LLP

(57) ABSTRACT

In some embodiments, an apparatus includes conductors, and a transmitter including transmitter test circuitry to embed test properties in test pattern signals, and transmit the test pattern signals to the conductors. In some embodiments, an apparatus includes conductors to carry test pattern signals with embedded test properties, and receiver test circuitry to receive the test pattern signals and extract the test properties and determine whether the extracted test properties match expected test properties. Other embodiments are described and claimed.

22 Claims, 27 Drawing Sheets

$P_k$: Embedded test properties seq(*Test Patterns*) ⇒ seq(S[0 : K - 1])

Test properties can be expressed in
seq(S[0 : K - 1])

If $g_8 = g_9 = \oplus$ and $e[8] = e_8 \oplus C[0]$ $e[9] = e_9 \oplus C[1]$, $C[0] = e_8 \oplus e[8] = S[0]$ $C[0] = e_9 \oplus e[9] = S[1]$

FIG. 16

$$S'_e[i] = C_e[i] \oplus S_e[i], \quad i \in \{0,1\}$$

$$= \begin{cases} S_e[i], & \text{if } C_e[i] = 0 \\ \overline{S_e[i]}, & \text{otherwise} \end{cases}$$

If $f_h(\overline{E}[0,2,4,6]) = \overline{E}[0] \oplus \overline{E}[2] \oplus \overline{E}[4] \oplus \overline{E}[6]$, $S_{\overline{E}}[0] = C_E[0] \oplus f_h(\overline{E}[0,2,4,6]) \oplus \overline{E}[8]$ $= C_E[0] \oplus f_h(E[0,2,4,6]) \oplus \overline{E}[8]$ $= \overline{S_E}[0]$ Similarly, $S_{\overline{E}}[1] = \overline{S_E}[1]$

FIG. 24

$$I_{e12} = \bigcup_{k=0}^{6} e[2k] - \{e[12]\}$$

$$I_{e7} = \bigcup_{k=0}^{6} e[2k+1] - \{e[7]\}$$

$$I_{e2} = \bigcup_{k=0}^{5} e[2k+2] - \{e[2]\}$$

FIG. 32

$$S[0] = e_{12} \oplus e[12] = f_0(l_{12}) \oplus e[12]$$

$$S[1] = e_7 \oplus e[7] = f_1(l_7) \oplus e[7]$$

$$S[2] = e_2 \oplus e[2] = f_2(l_2) \oplus e[2]$$

where $$f_0(l_{12}) = \left(\bigoplus_{k=0}^{5} e[3k]\right) \oplus e[12]$$

$$f_1(l_7) = \left(\bigoplus_{k=0}^{5} e[3k+1]\right) \oplus e[7]$$

$$f_2(l_2) = \left(\bigoplus_{k=0}^{4} e[3k+2]\right) \oplus e[2]$$

$$S_e[0] = C_{RX}[0] \oplus S_{rx}[0]$$
$$S_e[1] = C_{RX}[1] \oplus S_{rx}[1]$$
$$S_e[2] = C_{RX}[2] \oplus S_{rx}[2]$$

FIG. 40

If $C_{RX}[2:0] = S_{RX}[2:0]$, $$S_e[i] = C_{RX}[i] \oplus S_{rx}[i], \quad i \in \{2,1,0\}$$
$$= S_{RX}[i] \oplus S_{rx}[i]$$
$$= \begin{cases} 0, & \text{if } S_{RX}[i] = S_{rx}[i] \\ 1, & \text{otherwise} \end{cases}$$

Where $S_{RX}$ is an expected class signature

FIG. 41

INTERFACE TEST CIRCUITRY AND METHODS

RELATED APPLICATION

This application claims the benefit of U.S. Provisional Application No. 60/859,355, filed Nov. 15, 2006.

FIELD

Embodiments of the inventions relate generally to interface test circuitry and methods. Examples include high speed input/output circuits (HSIO) test circuitry and methods that may be used in, for example, built-in self-test (BIST).

BACKGROUND

The price of commercial integrated circuits (ICs) (chips) is continuously under pressure but the cost of some testing may tend to persist if not increase. Test cost of HSIO may be even higher compared to conventional digital counter circuits because it may be more difficult to make an HSIO test work and may require additional specialized high-end automated test equipment (ATE). It is desirable to develop HSIO test circuits and processes that may speed up production test development and that may provide flexible test interface to accommodate a wide range of test applications. Such test circuits and processes may reduce overall costs and increase the value of products.

BISTs in HSIO commonly use a pseudo-random binary sequence (PRBS) generator in a transmitter circuit (TX) and a receiver circuit (RX). An example of a conventional PRBS BIST is shown in FIG. 1, in which capital letters $D_i$ denote an 8-bit data test vector and capital letters $E_i$ denote a 10-bit codeword generated in a transmitter 12 (TX). The corresponding action of a receiver 14 (RX) is denoted using lower case letters $d_i$ and $e_i$. The stream of 8-bit data and of 10-bit codeword is enclosed in arrow brackets (> ... >) indicating the beginning and end of test patterns. A PRBS generator 18 provides the sequence $> \ldots D_3 D_2 D_1 >$ which is encoded by encoder 22 to create the encoded sequence $> \ldots E_3 E_2 E_1 >$ to which control character(s) $K_0$ (which may be a large number of control characters) is added to make a test pattern $> \ldots E_3 E_2 E_1 K_0 >$. The control character is used by the receiver to identify the beginning of an encoded test pattern. The encoded test pattern is serialized by serializer 24 and provided through channel 28 to deserializer 32 of RX 14. Deserializer 32 provides a received encoded test pattern $> \ldots e_3 e_2 e_1 k_0 >$ to decoder 38 which provides the decoded received sequence $> \ldots d_3 d_2 d_1 >$. The control character $K_0$ may be removed before or after the test pattern is provided to decoder 38. A PRBS generator 44 in RX 14 generates the same sequence $> \ldots D_3 D_2 D_1 >$ as in TX 12 which is compared in block 48 with the decoded received sequence $> \ldots d_3 d_2 d_1 >$. If the two sequences are identical, then there is not an error, if they are different, then there is an error.

The symbols Di and di are 8-bit values and the symbols $E_i$ and $e_i$ are corresponding 10-bit encoded values. Symbols $K_0$, and $k_0$ are also 10-bit values, but are not necessarily encoded from 8 bit values. Examples of 8 to 10 bit encoding techniques include the well known 8b10b coding and transition minimized differential signaling (TMDS). An overview of TMDS is provided in chapter 3 of the Digital Visual Interface (DVI) revision 1.0 standard dated Apr. 2, 1999, available from the Digital Display Working Group at www.ddwg.org. DVI and High-Definition Multimedia Interface ("HDMI") are each a TMDS-based signaling protocol.

Because the same transmitted test patterns should be received at RX under an error free environment, HSIO test often involves two identical PRBS 18 and 44 that are synchronized via a special control character(s), say $K_0$, in the beginning of test pattern. The TX PRBS generates test patterns to transmit and the RX BIST generates an expected output to compare. The TX PRBS may generate the $K_0$ and prefix it to the stream of codeword to be transmitted. When the designated control character ($K_0$) is detected, the RX PRBS starts comparing expected test patterns with the received to identify failures. Test patterns in the PRBS are generated based on linear feedback shift registers (LFSR) 52. The behavior of LFSR 52 may be characterized by its characteristic polynomial. An example of LFSR 52 and its characteristic polynomial is shown in FIG. 2. The symbol $\oplus$ denotes an exclusive-OR (XOR) gate and the symbol D denotes a D-type flip flop, although other gates other than XOR gates may be used and flip flops other than D-type flip-flops may be used. The LFSR may generate a fixed sequence of test patterns. Its sequence is determined by the initial state called a seed.

The embedding fixed polynomial in RX PRBS may complicate the test for both internal and external customers. Some customers may want to use their own LFSR or ATE that may be equipped with the different polynomials. Their test applications may also require diversified test patterns from a number of different LFSR polynomials or shuffled version of existing LFSR generated test patterns.

The conventional PRBS often lacks online testing features. Online and off-line testing refers to tests runs during normal functional mode and test mode, respectively. Online testing capability may offer to measure channel quality with respect to bit-error-rate (BER) in real system applications. The PRBS is usually employed in an off-line test environment. It runs during test mode only and is usually disabled during a normal functional (normal operating) mode.

SUMMARY

In some embodiments, an apparatus includes conductors, and a transmitter including transmitter test circuitry to embed test properties in test pattern signals, and transmit the test pattern signals to the conductors.

In some embodiments, an apparatus includes conductors to carry test pattern signals with embedded test properties, and receiver test circuitry to receive the test pattern signals and extract the test properties and determine whether the extracted test properties match expected test properties.

In some embodiments, a system includes a channel; a transmitter, and receiver test circuitry. The transmitter includes transmitter test circuitry to embed test properties in test pattern signals, and transmit the test pattern signals to the channel. The receiver test circuitry is coupled to the channel and receives the test pattern signals and extracts the test properties and determines whether the extracted test properties match expected test properties.

Other embodiments are described and claimed.

BRIEF DESCRIPTION OF THE DRAWINGS

The inventions may be understood by referring to the following description and accompanying drawings that are used to illustrate embodiments of the invention. However, the inventions are not limited to the details of these drawings. Indeed, embodiments of the invention may be implemented through different details.

FIG. 16 illustrates examples of equations for class generating functions.

FIG. 24 illustrates examples of equations for class signatures.

FIG. 32 illustrates examples of equations for inputs.

FIGS. 40 and 41 each illustrate equations for calculating class signatures.

DETAILED DESCRIPTION

In some embodiments, protocol insensitive test properties are embedded into data to be transmitted so that the same test properties may be checked at the receiver to detect errors if they occur. In some embodiments, BIST circuitry is used which is independent of particular encoding techniques and detects errors that change the validity of codewords. The validity of codewords may be defined using embedded test properties. From some points of view and in some embodiments, the test properties may be viewed as specifications that a set of test patterns satisfies. Some embodiments may be implemented in various domains, examples of which include 8-bit data domains and 10-bit codeword domains. For example, in some embodiments, circuitry may generate patterns and detect errors in 8-bit data or in 10-bit codewords, but other bit widths or symbols may be used. In some embodiments, online testing capability is included.

Streams of signals may be composed of signal sections. Examples of signal sections include unencoded data sections (such as 8-bit data) and codewords (which may be 10-bits or some other width). In embodiments described below, the nature of the signal sections changes as the streams of signals are modified through circuitry described below.

Figure 1:
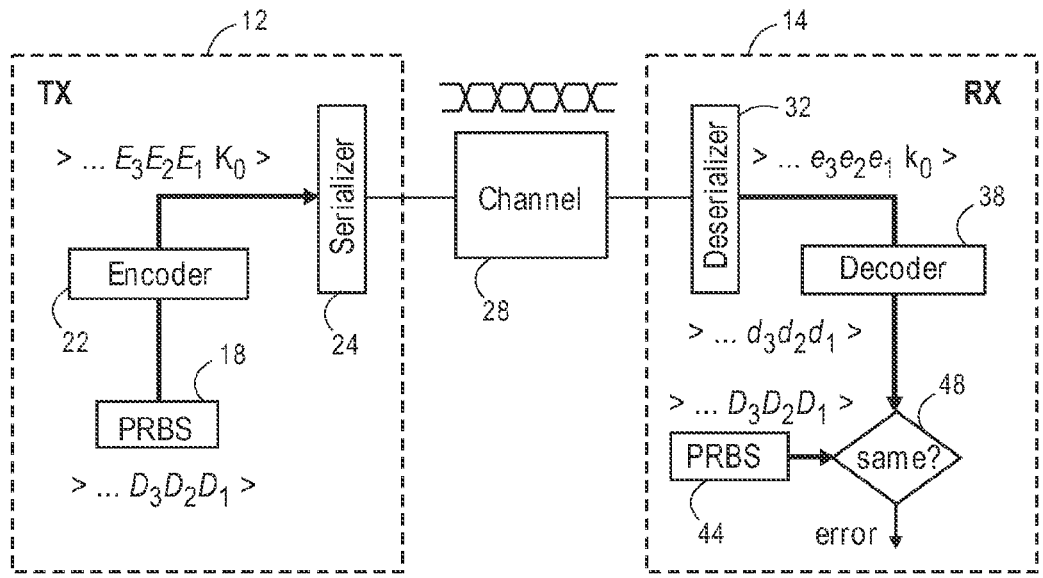
FIG. 1 is a block diagram representation of a prior art system including a transmitter and a receiver.
Figure 2:
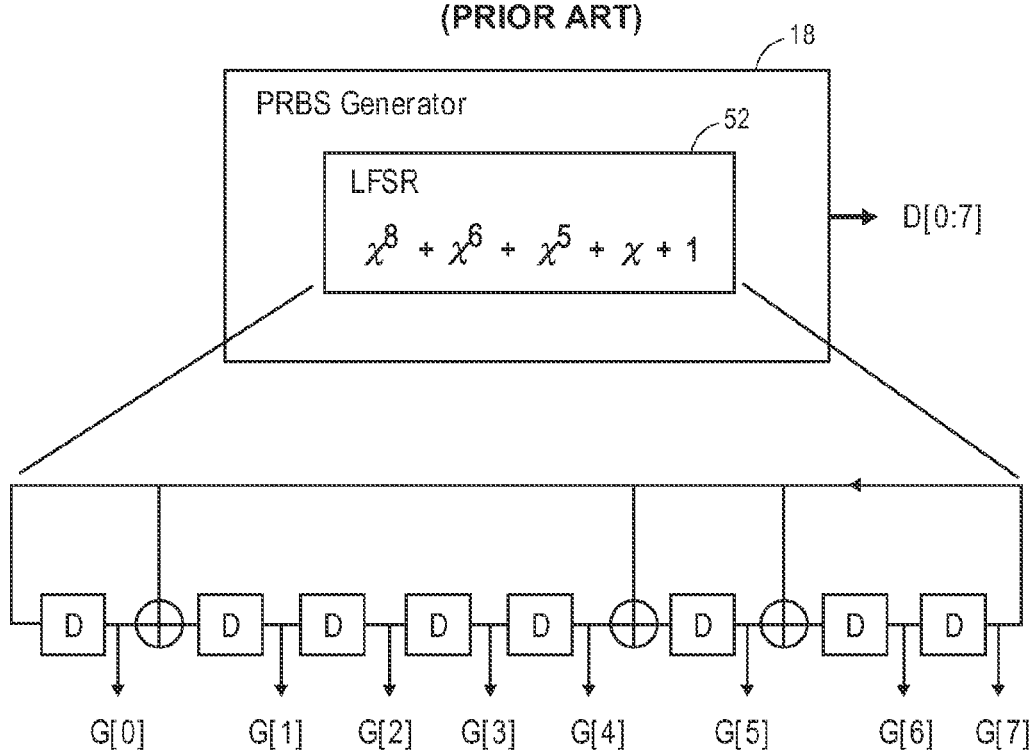
FIG. 2 is block diagram representation of a prior art pseudo-random binary sequence (PRBS) generator including linear feedback shift registers (LFSR).
Figure 3:
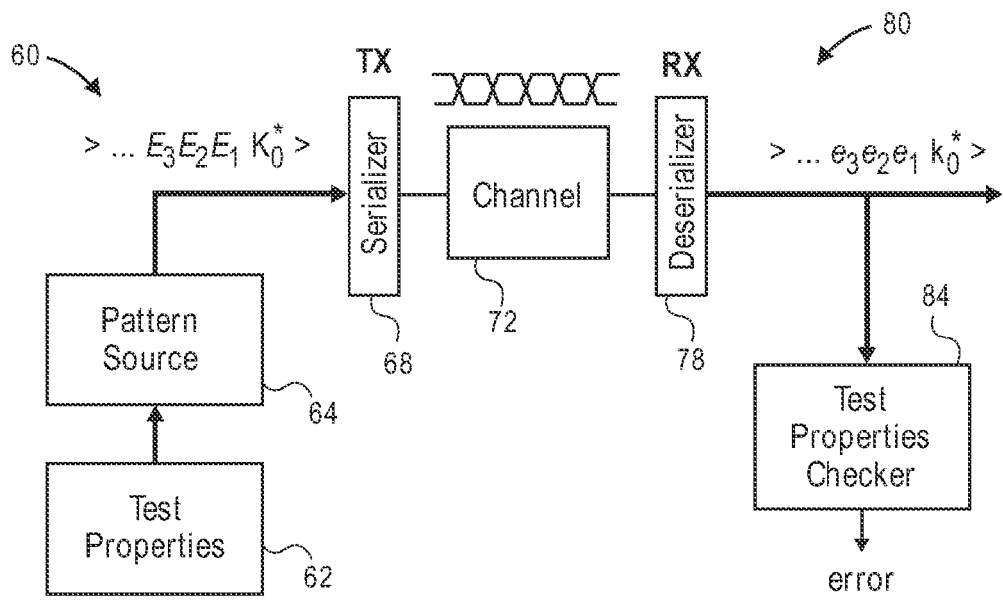
FIG. 3 is a block diagram representation of an interface test system including a transmitter and a receiver.

Referring to FIG. 3, transmitter 60 includes test properties 62 which are provided to pattern source 64. Pattern source 64 outputs test pattern $> \ldots E_3 E_2 E_1 K_0>$ which is serialized by serializer 68. In some embodiments, a control character(s) $K_0$ (which may be a large number of control characters) may be prefixed to or otherwise included with the test pattern. For example, it may be used to identify the beginning of a test pattern, which may be used for synchronization at the property checking. Such control characters $K_0$ may be used in connection with various other examples, but are not explicitly shown or mentioned. The serialized test pattern is carried on channel 72 to deserializer 78 of receiver 80. Receiver 80 also includes test properties checker 84 which receives the received test pattern $> \ldots e_3 e_2 e_1 k_0>$. Details of various examples of the test pattern are provided below.

In some embodiments, the RX test circuitry may be decoupled (in operation and in some cases physically) from the TX test circuitry. The test properties may be checked in real time or at a later time. Accordingly, there may be storage circuitry to hold certain signals for a later check for errors. (See optional storage circuitry 814 in FIG. 42.) In some embodiments, the RX test circuitry is independent of TX PRBS polynomials (although in other embodiments it uses them). The test properties may specify what kind of test patterns may be transmitted to the RX test circuitry to validate a device under test (DUT). In this sense, the test properties may be considered like prior art communication protocols in that the test properties may define types of test patterns to be transmitted over the channel during the test. Those embedded properties may be extracted from the incoming data stream and checked to detect errors. The proposed test properties may be embedded in a test pattern source. As examples, the test pattern source may include ATE vectors, PRBS patterns, and any other external pattern sources. In some embodiments, PRBS polynomials are used in generating test properties, but in other embodiments, PRBS polynomials are not used in generating the test properties.

Figure 4:
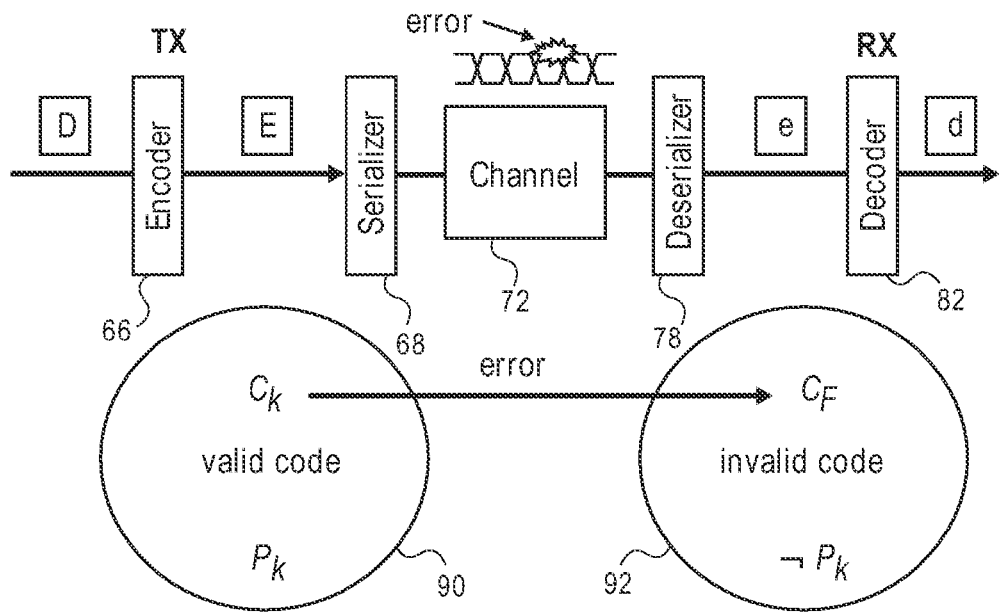
FIG. 4 is a block diagram representation of a transmitter and a receiver illustrating embedded test properties and error detection.

FIG. 4 illustrates an example of how error detection may be achieved in the proposed embodiments. FIG. 4 is similar to FIG. 3 but illustrates data D being encoded by encoder 66 and test patterns E with intended embedded test properties transmitted over channel 72. A decoder 82 decodes the received test patterns e to create received data d. As shown in circle 90, a valid code $C_k$ includes test properties $P_k$. If an error occurs somewhere in the transmitting or receiving invalidates the test properties embedded in the transmitted data stream, the error may be checked and detected at the receiver. When the test properties of the received test pattern are not the same as the expected test properties, the comparison reveals an invalid code $C_F$ with invalid test properties $\neg P_k$ as indicated in circle 92. Checking for invalid codewords may occur before or after the incoming signal is decoded by decoder 82.

Figure 5:
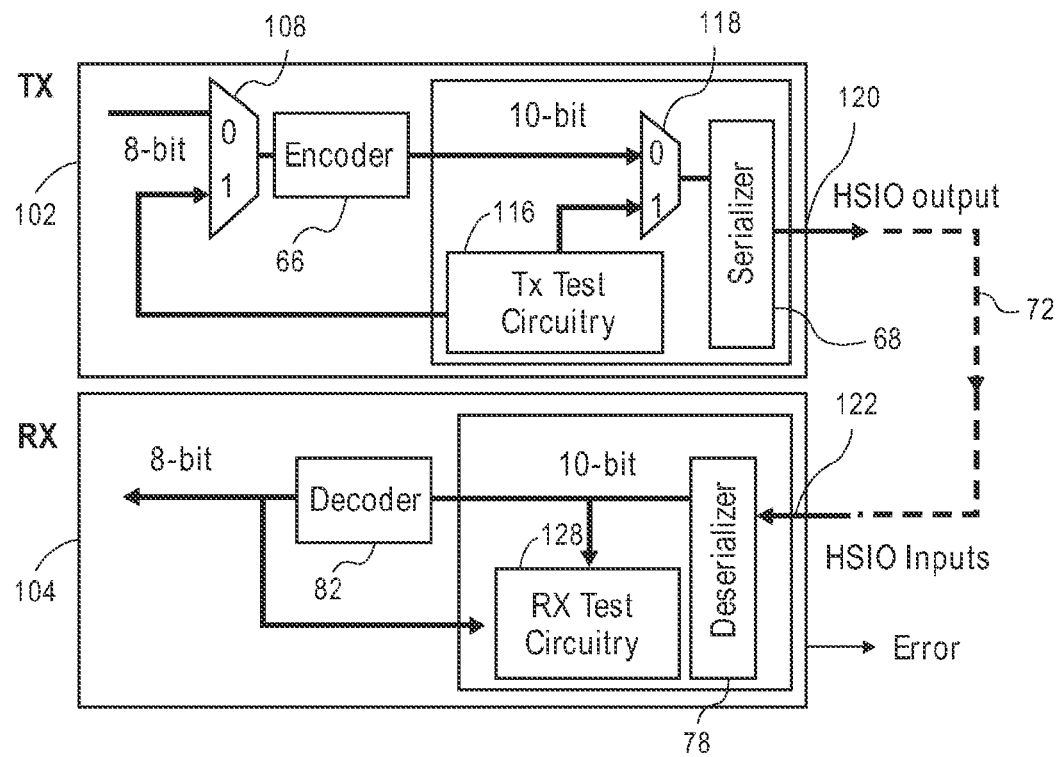
FIG. 5 is a block diagram representation of an interface test system including a transmitter and a receiver.

Transmitters may be implemented in various ways. FIG. 5 shows an example of a transmitter 102 according to some embodiments. When multiplexers 108 and 118 are each in a "0" state, a data signal (such as an ordinary non-test signal in ordinary operation) is passed through multiplexer 108, encoded by encoder 66, passed through multiplexer 118, serialized by serializer 68 and provided through HSIO outputs to channel 72. When multiplexer 108 is in the "1" state and multiplexer 118 is in the "0" state, a data signal test pattern is provided from TX test circuitry 116 through multiplexer 108 and encoded by encoder 66. The test pattern signal from encoder 66 is provided through multiplexer 118 to serializer 68 and channel 72. When multiplexer 118 is in a "1" state, text circuitry 116 provides the test pattern signal directly through multiplexer 118 to serializer 68 and channel 72. As used herein, the term data is used broadly to mean any signal whether used as commands, address, traditional data, or something else. In some embodiments, test circuitry 116 uses bits from the output of encoder 66 (for example as inputs to test encoding functions, described below), or test circuitry 116 may have a separate encoder on an incoming data stream. In some embodiments, as described below, test circuitry 116 may use the test encoding functions on unencoded data and, therefore, may receive bits from the incoming data stream prior to it being received by encoder 66.

Receiver 104 receives signals on channel 72 through HSIO inputs. The received signals are deserialized through deserializer 78 and provided to RX test circuitry 128 and decoder 82. Decoder 82 provides an 8-bit data signal to test circuitry 128 and other parts of a chip that includes receiver 102. An 8-bit data signal is an example of a data section. Data sections may be in other widths. Test circuitry 128 compares the received test properties with expected test properties and determines whether an error has occurred. Conductors 120 may be part of channel 72 or be internal conductors coupled between drivers of the transmitter and channel 72. Conductors 122 may be part of channel 72 or be internal conductors between channel 72 and receivers of receiver 104. In some embodiments, an error signal has a first value if there is not an error and a second value if there is an error. In some embodiments, the error signal provides additional information. Various other approaches can be used. The error determination may be accomplished in various ways, examples of which are described in this disclosure.

Other embodiments may have various other details. For example, in some embodiments, transmitters TX 102 does not have the ability to provide test pattern signals through both multiplexer 108 and directly through multiplexer 118, but rather merely one or the other. Likewise, in some embodiments, RX 104 does not have the ability to provide received test pattern signals both directly to test circuitry 128 and also from decoder 82, but rather merely one or the other.

TX 102 and RX 104 may be in the same chip or in separate chips. If there is one chip containing both TX 102 and RX 104, it may be device (or chip) under test. If TX 102 and RX 104 are in different chips, they may both be chips under test, or only the chip with TX 102 may be considered under test, or only the chip with RX 104 may be considered under test. In FIG. 5, the chip with TX 102 may be a device under text and RX 104 may be part of text equipment. Alternatively, TX 102 may be part of text equipment and RX 104 may be part of a device under test. Still alternatively, TX 102 may be part of a device under test that is coupled to test equipment that is different than receiver 104, or RX 104 may be part of a device under test that is coupled to test equipment that is different than TX 102 but that produces a similar signal. Other approaches may be used.

Depending on the embodiment, the test circuitry may operate on any size of data word or of codeword. Since 8-bit data word and 10-bit codeword are commonly used formats in HSIO, this disclosure provides examples with 8-bit data words and 10-bit codewords. TX test circuitry 116 may generate streams of 8-bit data words and 10-bit codewords that embed test properties. The generated 8-bit data words are encoded into a 10-bit valid codeword stream and transmitted over channel 72. The received 10-bit codeword stream and 8-bit decoded data stream may be checked against the test properties embedded in the stream. In some embodiments, all of the bits to be transmitted are encoded. In other embodiments, some of the bits to be transmitted are not encoded.

In some embodiments, codewords may be used in the test that would otherwise be invalid for the particular encoding technique. In many encoding techniques (such as 8b10b encoding), some 10-bit codewords are not valid—meaning they cannot be validly obtained. (The word invalid is used in different ways in this disclosure: (1) an error in the transmission process and (2) a codeword that cannot be validly obtained given the constraints of an encoding process.) In some embodiments, for testing purpose, however, invalid codewords may be used to increase controllability and observability. In order to target functional failures whose detection may involve sensitization or excitation of electrical properties such as jitter and inter-symbol interference (ISI), inclusion of invalid codewords in a test pattern set may increase a chance of targeted sensitization.

The following section discusses some of the various ways in which test properties may be derived and embedded into 8-bit data streams as well as 10-bit codeword streams.

Test Properties and Architecture of Test Circuitry

As used in some embodiments, the test patterns may be viewed as a sequential pattern of 8-bit data or 10-bit codeword. The sequence of data or codeword in the test pattern is called a test pattern sequence. As used in some embodiments, the test properties may be derived by interpreting each test pattern in the test pattern sequence as a tuple carrying inputs and outputs of some functions.

Figure 6:
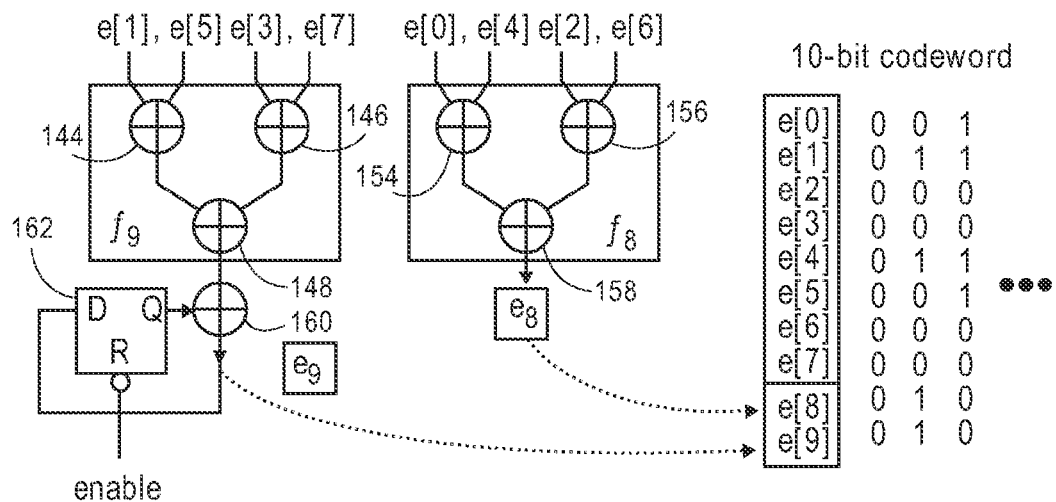
FIG. 6 is a block diagram and graphical representation of codeword test encoding functions.

For each codeword $e_i[0:9]$ in a stream $> \ldots e_3 e_2 e_1 >$ may be interpreted, for example, as $e_i[0:9]=(i8,i9,i8,i9,i8,i9,i8,i9,o8,o9)$, where ik and ok denote an input and an output of a function $f_k$ called test encoding function. (The same may apply to the transmit side stream $> \ldots E_3 E_2 E_1 >$. In some embodiments, the same is true of data ($d_i[0:7]$ and ($D_i[0:7]$).) The test encoding functions may be considered as an interpretation of each 10-bit codeword in the pattern sequence. Test encoding functions may be combinational or sequential. As an example, generation of 10-bit codeword using test encoding functions are illustrated in FIG. 6. Function $f_9$ involves codeword bits e[1] and e[5] being XORed through XOR gate 144, codeword bits e[3] and e[7] being XORed through XOR gate 146, and the results being XORed by XOR gate 148. An optional XOR gate 160 receives the results of XOR gate 148 and the output of an optional flip-flip 162. If enable=1, $e_9$ may be output of the sequential function that depends on previous value of $e_9$. Otherwise $e_9$ is output of the combinational function $f_9$. Function $f_8$ involves codeword bits e[0] and e[4] being XORed through XOR gate 154, codeword bits e[2] and e[6] being XORed through XOR gate 156, and the results being XORed by XOR gate 158 to provide $e_8$. A flip-flop and extra XOR gate may be used as with $e_9$. In order to keep discussion simple, the combinational test encoding functions are assumed in this disclosure. As can be seen in FIG. 6, the test encoding functions are physical structures and not merely activities. It may be said that the test encoding functions of FIG. 6 "receive" bits from the codeword stream even if in some sense the streams at least temporarily retain the bits while the test encoding function is operating.

In FIG. 6, the encoding functions $f_8$ and $f_9$ compute odd parity of even and odd bit position of e[0:7] respectively. Computed $e_8$ and $e_9$ are placed to e[8:9] to form a desired 10-bit codeword. In some embodiments, any test encoding functions may be employed depending on types of errors to be handled and on test pattern constraints imposed by protocol under consideration. The test pattern constraints include maximum run length. The run length specifies a number of consecutive zeros and ones in a serialized bit stream. For example, the maximum run length of TMDS, for example, is 21.

Figure 7:
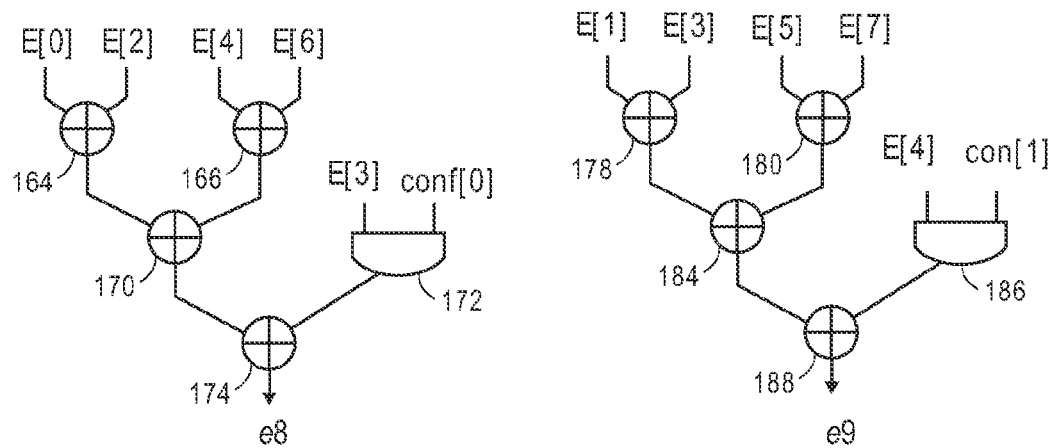
FIG. 7 is a block diagram representation of configurable test encoding functions.

In some embodiments, the encoding functions are configurable to increase testability and to improve quality of tests. An example of configurable encoding functions is depicted in FIG. 7 in which E[0] and E[2] are XORed by gate 164, E[4] and E[6] are XORed by gate 166, with the results of gates 164 and 166 being XORed by gate 170. XOR gate 174 XORs the results of gate 170 and an AND gate 172 having inputs E[3] and a configuration control bit (con[0]) to produce bit $e_8$. Likewise, E[1] and E[3] are XORed by gate 178, E[5] and E[7] are XORed by gate 180, with the results of gates 178 and 180 being XORed by gate 184. XOR gate 188 XORs the results of gate 184 and an AND gate 186 having inputs E[4] and a configuration control bit (con[1]) to produce bit $e_9$. By programming the 2-bit configuration control inputs (conf[0:1]), the encoding function may be configured into 4 different functions. In FIG. 7, for example, if conf[0]=1, conf[1]=1, or both, the resulted encoding function includes an extra input to the original encoding function in FIG. 6. The different encoding functions may be used to detect errors that may be missed by other encoding functions and hence may improve quality of tests. The configurable encoding function also may increase the number of available test patterns. The increased available test patterns may allow more errors in analog circuitry to be excited and observed.

Note that in FIG. 6, lower case letters "e" are used, but in FIG. 7, upper case letters "E" are used. As noted above, the upper case letters "E" refer to signals in the transmitter and the lower case letters "e" refer to receiver. However, in general, the circuitry of the figures can be used in both the transmitter and the receiver. In order to avoid duplication of the figures and descriptions, some figures and descriptions use an upper case L and others use a lower case e. The same is the case with "D" and "d" unless stated otherwise.

Figure 8:
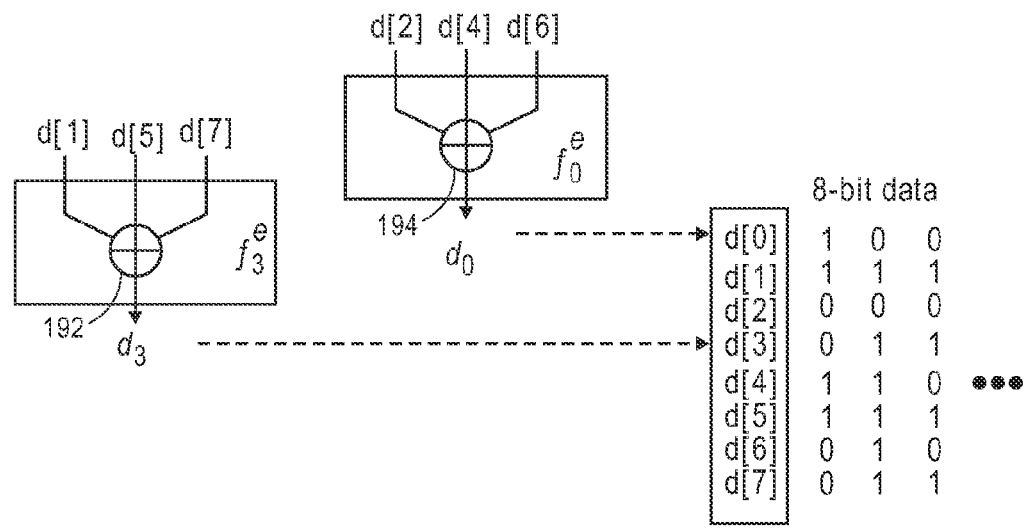
FIG. 8 is a block diagram and graphical representation of data test encoding functions.

In some embodiments, test encoding is carried out in 8-bit data as illustrated in FIG. 8. Parity of specified bit locations may be assigned to one of data bit locations. For example, the data bit locations d[0] and d[3] may be interpreted as a parity of remaining even and odd bit positions respectively. In the example, XOR gate 192 receives bits d[1], d[5], and d[7] to produce $d_3$ which is provided as d[3]. XOR gate 194 receives bits d[2], d[4], and d[6] to produce $d_0$ which is provided as d[0]. In some embodiments, advantages of test encoding in 8-bit data domain may include protocol independency. No protocol related constraints need to be considered because those constraints may be handled by the encoder. In some embodiments, disadvantages may include reduced testability due to limited controllability caused by a smaller number of test stimulus available and difficulty of controlling test data sequences to target errors resulted from analog circuitry operated in a 10-bit codeword domain. If the test encoding is on data sections as in FIG. 8, the sections could be encoded after the activity of FIG. 8. The additional encoding could be a well known encoding such as 8b10b or TMDS, or it could be an encoding like that of FIG. 6.

Although some of the embodiments may similarly be applied to both 8-bit data and 10-bit codeword, the codeword is used to discuss the concept throughout this disclosure and the 8-bit data is mentioned where appropriate.

The test encoding functions alone do not accommodate all possible codewords. For 10-bit codeword, for example, there are 1024 ($2^{10}$) possible codewords. The test encoding function, however, allows 256 ($2^8$) codewords. This is because if the first 8 bits (e[0:7]) are determined, the last two bits (e[8:9]) are calculated from them. In the examples, e[0:7] are independent variables and e[8:9] dependent. In order to encompass all possible codewords (or at least additional codewords) during the test, concept of signature may be introduced.

Figure 9:
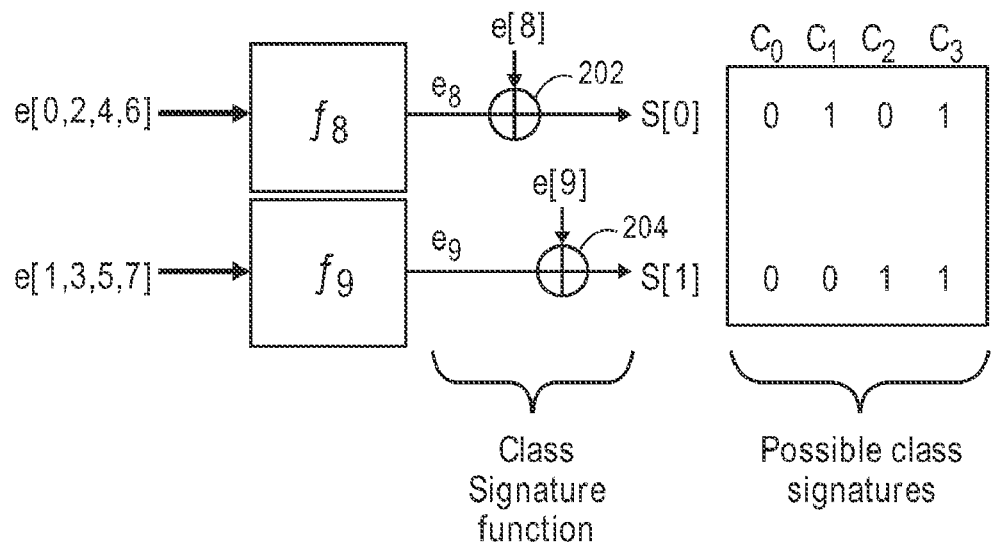
FIG. 9 is a block diagram and graphical representation of test encoding functions, class signature functions, and class signatures.

An example of a class signature of codeword is illustrated in FIG. 9 in which e[0, 2, 4, 6] are provided to test encoding function $f_8$ to produce bit $e_8$ and e[1, 3, 5, 7] are provided to test encoding function $f_9$ to produce bit $e_9$. The class signature S[0] and S[1] may indicate how the outputs of calculated functions called $e_8$ and $e_9$ are related to the e[8:9]. In order to derive the intended relationship, some functions may be employed to interpret their relations. These functions are called class signature functions. In the example of FIG. 9, XOR functions 202 and 204 are used to calculate class signature S[0] and S[1]. In this case, the logical 0 and 1 of class signature function output indicate agreement and disagreement (complement) between calculated e[i] and $e_i$ for i∈{8,9}, respectively. The class signature function may be expressed as $S[i-8]=e_i \oplus e[i]$.

Figure 10:
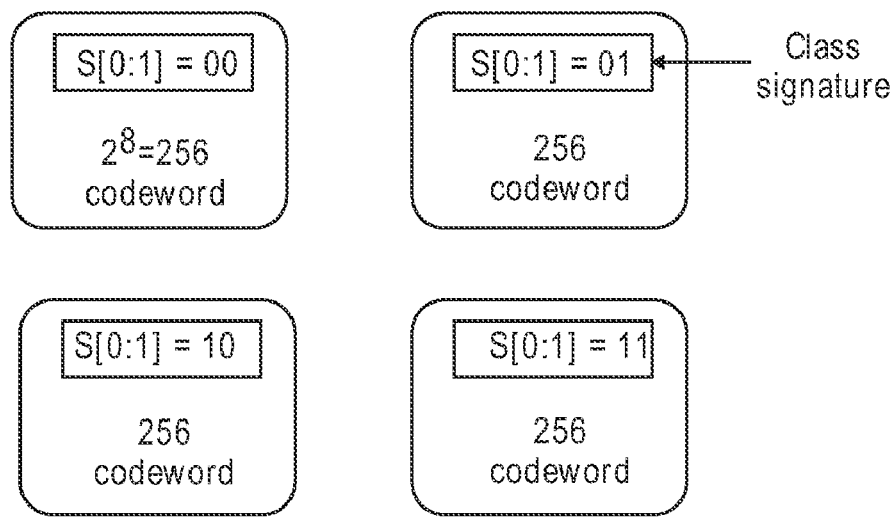
FIG. 10 is a graphical representation of partitioning of codewords by class signature.

Based on the class signature functions in FIG. 9, there may be 4 class signatures. In the example, any codeword must result in one of the 4 signatures. That is to say that the class signature functions partition a set of all possible codewords into a number of subsets. The number of subsets of codewords may be $2^N$, where N is the number of class signature functions. In the example, there are 2 class signature functions denoted as S[0:1] and therefore there are 4($2^2$) class signatures, as shown in FIG. 10.

Figure 11:
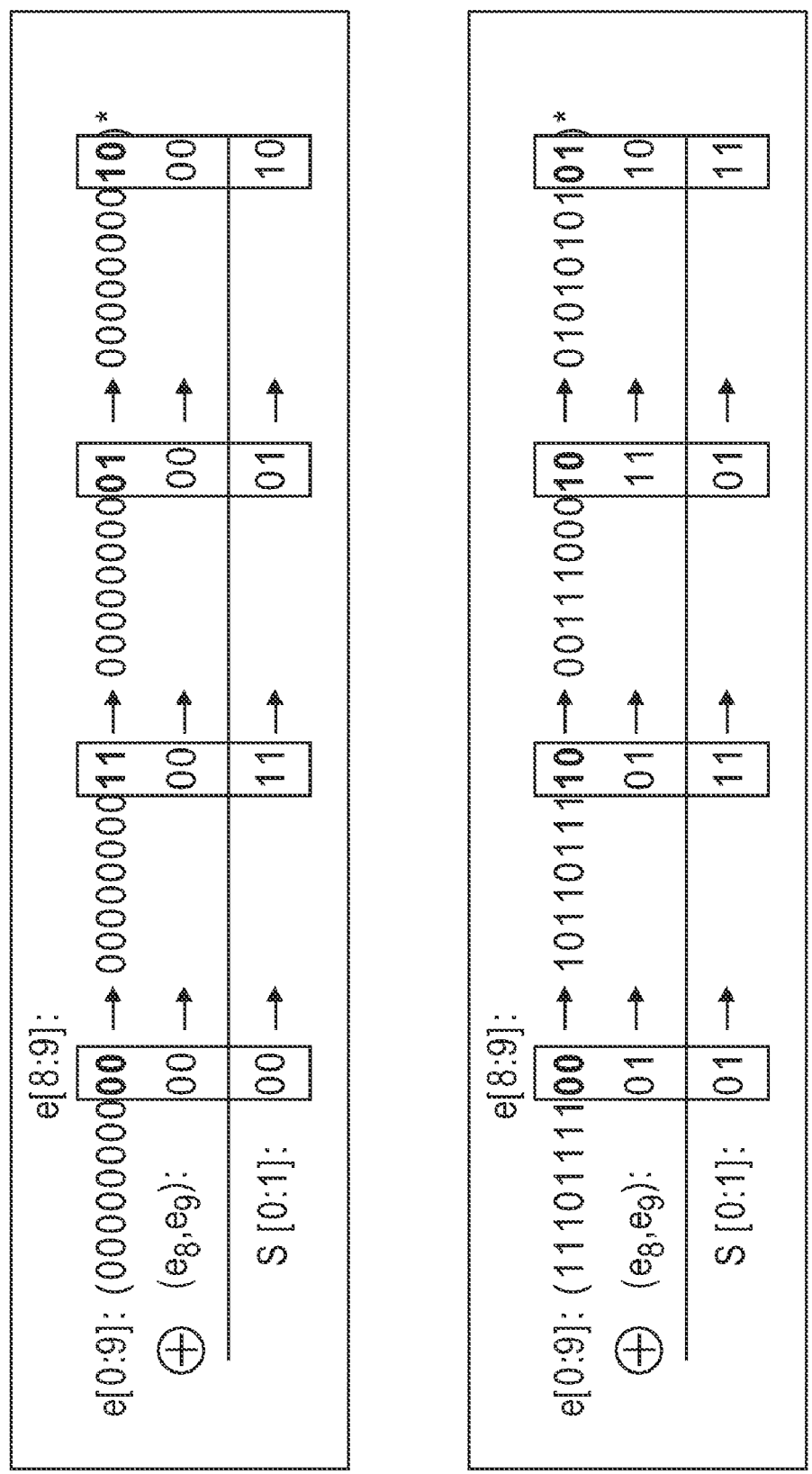
FIG. 11 is a graphical representation of codewords, outputs of test encoding functions, and class signature sequences.

The test patterns may be viewed as an ordered list of codewords that implements a desired test(s). The test pattern sequence may be represented by the corresponding class signature sequence. An example of class signature sequence is illustrated in FIG. 11. Suppose that four codewords, 0000000000, 0000000011, 0000000001 and 0000000010, are repeated in the test patterns. Since e[0:7]=00000000 for all codewords, the test encoding function outputs are 00 for all codewords, i.e. ($e_8$,$e_9$)=00. Thus, the class signature for each codeword may be calculated by performing bit-wise XOR functions on ($e_8, e_9$) and e[8:9]. The resulted class signature sequence S[0, 1] is depicted in the same figure. The S[0:1] sequence of second example test pattern may similarly be obtained and shown in the lower part of FIG. 11.

In some embodiments, the class signature functions may also be considered as an equivalence relation. Each class signature may be a representative of each class. Any two codewords that have the same class signatures may be equivalent. Similarly, any test patterns may be represented by their class signature sequences. This means that the class signature sequence may specify the intended test pattern. In some embodiments, test properties are expressed using the class signature sequences. Thus, test properties may include the class signature of each codeword and order of class signatures in the test pattern. For example, the test properties of first and second examples in FIG. 11 are (00→11→01→10)* and (01→11)*, respectively. The symbol * denotes any number of repetitions.

Figures 12, 13:
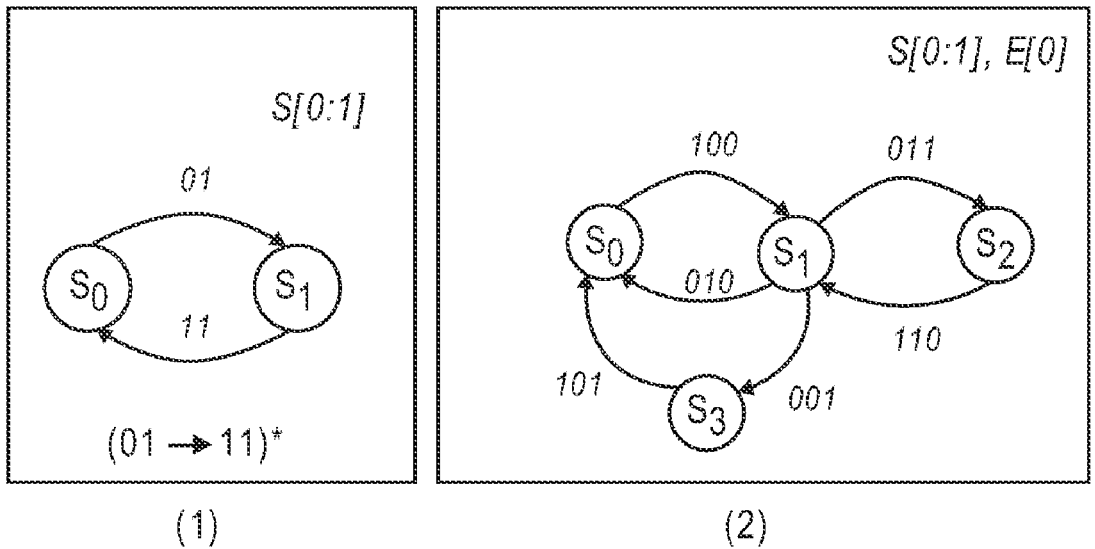
FIG. 12 illustrates state diagrams of test properties in terms of class signatures.
FIG. 13 is a graphical representation of test properties in terms of class signatures.

The test properties may also be expressed using a finite state machine (FSM) as shown in FIG. 12. The first example of FIG. 12 depicts the FSM representation of test spec (01→11)*. The test properties may not only include class signature inputs, but may also include internal or external inputs. The second example depicts a more sophisticated test property that also involves external or internal inputs. The non-signature input, for example, may be introduced internally from a 10-bit codeword or externally from the BIST environment. The second example of FIG. 12 is not necessarily related to other examples provided herein.

FIG. 13 summarizes the test properties expressed in a sequence of class signatures of test patterns. The test properties may be understood as a specification of test patterns. It may specify class or type of test pattern sequences and not a particular test pattern sequence. The logical equation with implication states that a test pattern sequence is an implementation (or member) of corresponding class signature sequence. Composition operations may be defined for class signatures. The variable K is the number of participating test encoding functions to generate the class signature. The value of K is 2 for the examples considered in this disclosure.

Figure 14:
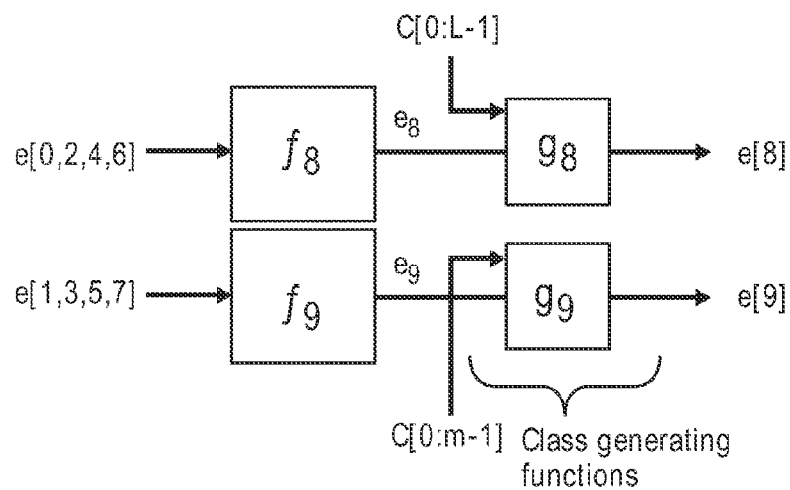
FIG. 14 is a block diagram representation including test encoding functions and class generating functions.

In some embodiments, to embed or check test properties in the stream of codewords, a desired class signature and sequence may be manipulated. In some embodiments, any desired class signatures may be embedded in the test pattern sequence using class generating functions. An example of class generating functions $g_8$ and $g_9$ (collectively $g_{8,9}$) is shown in FIG. 14. The class generating functions $g_{8,9}$ may modify the class signatures of codewords in the stream based on the control inputs provided to generalized input C[0:L−1] and C[0:M−1], which in the specific example may be control signals C[0] and C[1]. Note that as used herein, "modify" does not necessarily mean to change in particular cases, but rather means to change in some cases, but not necessarily all cases. For example, depending on the nature of class generating functions $g_{8,9}$, and the values of the control signals and $e_8$ and $e_9$, the outputs of the class generating functions $g_{8,9}$ may or may not be different than the inputs.

Bits e[0:7] are from positions 0, 1, 2, . . . 7 (a first group of positions) of 10-bit codewords and bits e[8:9] are for positions 8 and 9 (a second group of positions) of the 10-bit codewords. Of course, the inputs to the test encoding functions could be from positions other than positions 0-7 and the outputs of the class generating functions could be for positions other than bits in positions 8 and 9. Typically, the first and second groups of positions do not overlap, but in some embodiments they could overlap.

Figure 15:
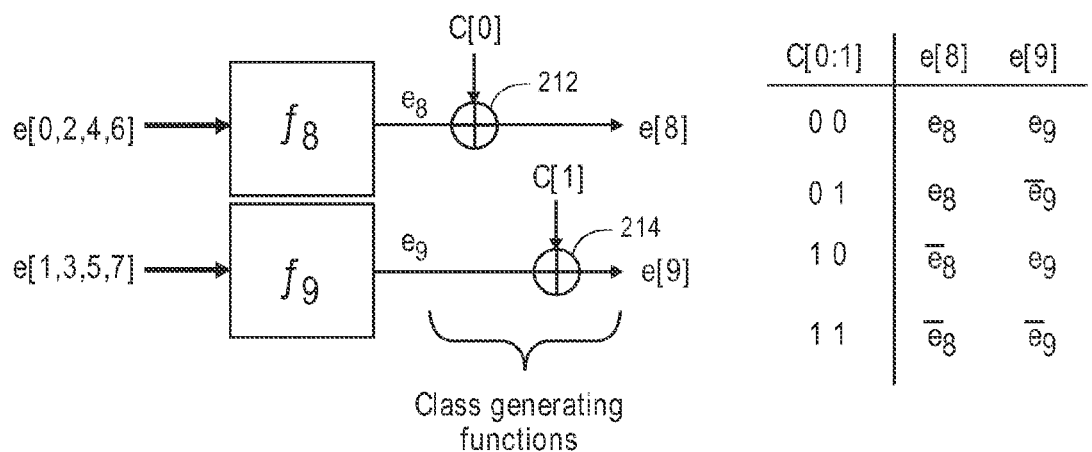
FIG. 15 is a block diagram and graphical representation including test encoding functions and class generating functions.

FIG. 15 provides an example in which class generating functions $g_8$ and $g_9$ are XOR gates. Also single bit control signals inputs C[0] and C[1] may be used to manipulate the value of e[8] and e[9] respectively. Note that value of $e_8$ and $e_9$ are unchanged and thus only class signature (S[0:1]) is modified as intended. In the same figure, truth table of e[8] and e[9] is described for the value of C[0:1]. When e[8] and e[9] are complemented when C[0] and C[1] are set to logical 1 respectively.

If the XOR function was used to generate class signatures, any class signature, S[0:1], may directly be controlled from the C[0:1]. This is summarized in FIG. 16. Since, in the examples, the C[0:1] is the same as S[0:1], the desired S[0:1] may be generated by providing the same desired S[0:1] to the C[0:1]. In the example, for the illustration purpose, the XOR implementation of class generating functions is assumed. The other functions, however, may be employed to generate class signatures depending on test applications.

Figure 17:
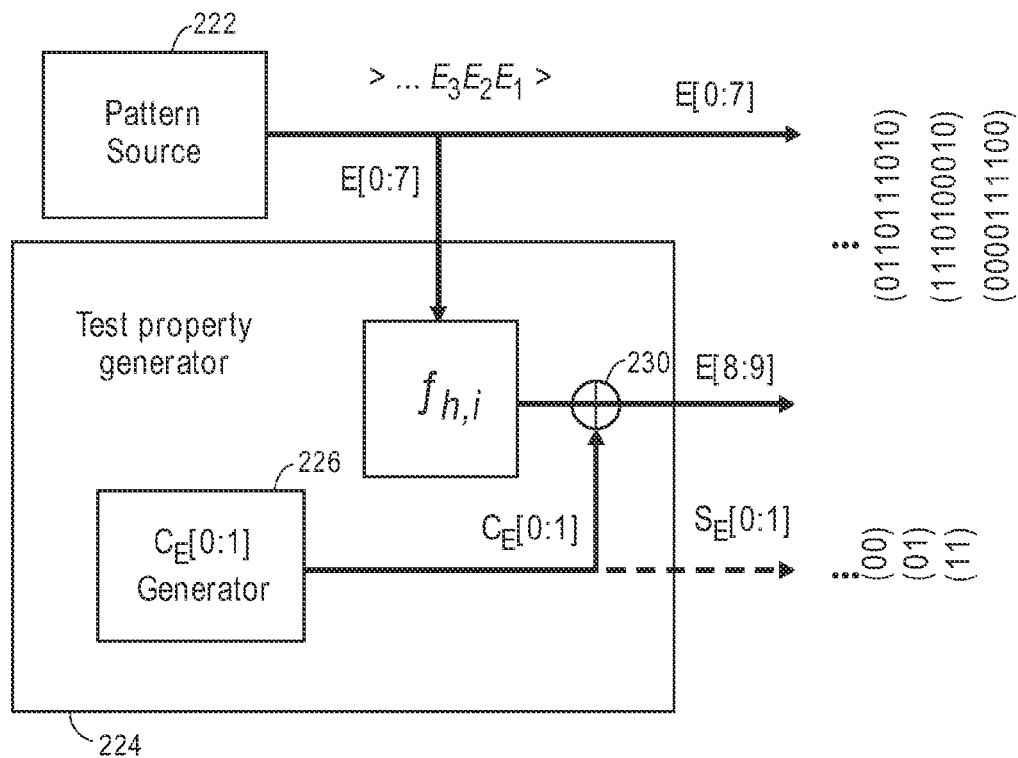
FIGS. 17 and 18 are each a block diagram representation of a pattern source and a test property generator.
Figure 18:
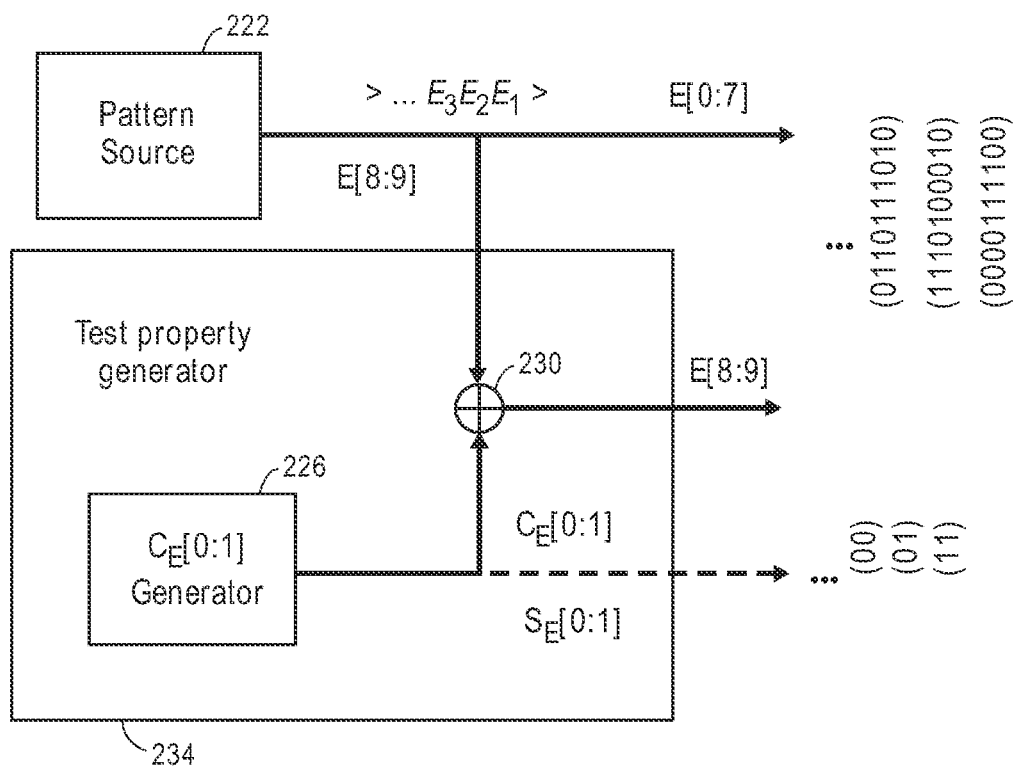

In some embodiments, a desired class signature sequence, seq(S[0:1]), may be embedded by providing a stream of desired seq(S[0:1]) to the C[0:1]. FIGS. 17 and 18 illustrate how test properties may be embedded into the stream of codeword. In the FIG. 17, a test property generator 224 includes test encoding functions $f_h$ and $f_i$ are denoted as $f_{h,i}$. A pattern source 222 provides > . . . $E_3E_2E_1$ > including E[0:7] which are received by $f_{h,i}$. Testing encoding functions $f_{h,i}$ provide $e_8$ $e_9$ to XOR gate 230. XOR gate 230 also receives $C_E[0:1]$ from class control signal generator 226. The seq(S[0:1]) may be embedded with or without test encoding functions. If 10-bit pattern source were used, for example, the C[0:1] may directly manipulate the e[8:9] without test encoding functions (see test property generator 234 in FIG. 18). Since the XOR function is commutative, the generated e[8:9] may be considered as test encoded by some functions. The C[0:1] may be used to modify an exiting class signature in e[0:9].

In some embodiments, the seq(C[0:1]) that generates desired seq(S[0:1]) may be implemented using a finite state machine (FSM) called $C_E[0:1]$ generator (for example, generator 226 in FIGS. 17 and 18). The $C_E[0:1]$ generator may be programmed to provide required seq(S[0:1]). Since embedding test properties is usually action of TX, the subscript E in capital letter is used, but in some embodiments it is used in the RX. The embedded test properties may also be observed via the output $S_E[0:1]$.

Figures 19, 20:
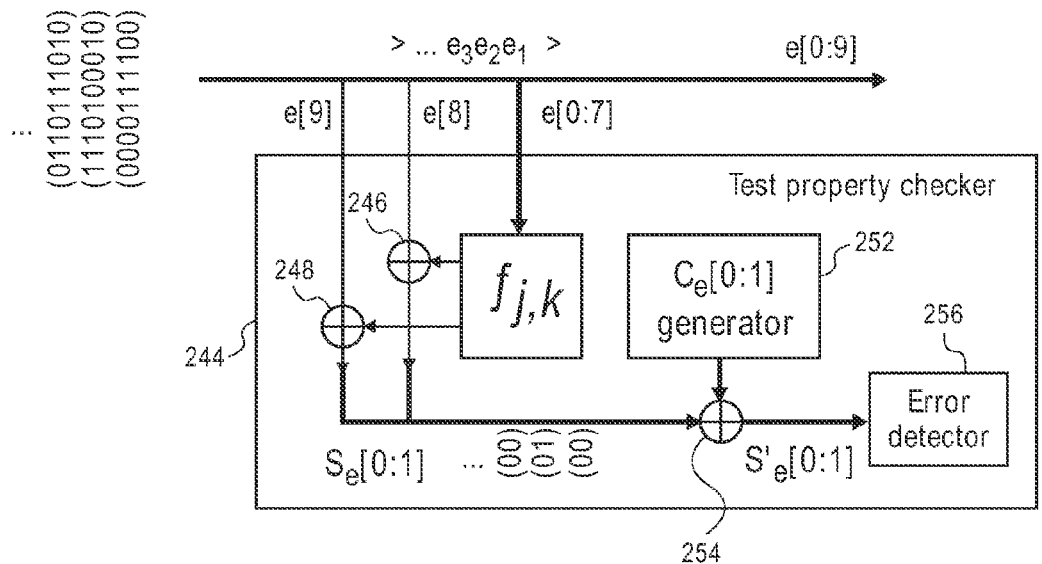
FIG. 19 is a block diagram representation of a test property checker.
FIG. 20 illustrates an equation for class signature generating functions.

Similarly, as shown in FIG. 19, in some embodiments, the embedded test properties may be extracted from the stream of incoming codewords and checked against an expected signature sequence. A test property checker 244 includes test encoding functions $f_j$ and $f_k$ denoted as $f_{j,k}$ which receives e[0:7] from the received stream >$e_3e_2e_1$>. XOR gates 246 and 248 XOR bits $e_8$ and $e_9$ from test encoding functions $f_{j,k}$ with XOR bits e[8] and e[9] from >$e_3e_2e_1$> to provide class signature sequence $S_e[0:1]$. The expected seq($S'_e[0:1]$) (modified sequence of expected class signature) may be generated by XORing the expected seq($S_e[0:1]$) with the control signals from $C_e[0:1]$ generator 252 with XOR gate 254. As summarized in FIG. 20, the XOR function may be performed between values of $C_e[0:1]$ and the expected class signature $S_e[0:1]$ to produce the expected $S'_e[0:1]$. Each extracted class signature $S_e[0:1]$ in the sequence is added through XORing to the corresponding $C_e[0:1]$. That is, the $C_e[0:1]$ transforms the $S_e[0:1]$ into $S'_e[0:1]$. The resulted seq($S'_e[0:1]$) may be then checked against the expected signature sequences implemented in the error detector 256. In some embodiments, employment of $C_e[0:1]$ generator may simplify design of error detector.

Error detector 256 may be implemented in a FSM or a combinational circuit. If, for example, seq($C_e$[0:1]) is the same as the expected seq($S_e$[0:1]), then seq($S'_e$[0:1]) is the sequence of zeros, i.e. seq($S'_e$[0:1])=<(00)(00)(00)...<. That is, in some embodiments, any non-zero class signature may be considered as an error. In such special case, the error detection may be implemented using combinational circuits. If, however, class signature sequence were not constant, in some embodiments, the FSM-based error detector may often be implemented to handle the errors.

In some embodiments, the TX and RX are assumed to be independent, and the size of $S_e$[0:L] does not need to be the same as that of $S_E$[0:K]. That is the index variable L is not necessarily the same as K. The stream of codeword may differently be interpreted at the TX and RX. The different test encoding functions may also be employed at both ends. For illustration purpose, L=K=2 is assumed in the examples.

Figure 21:
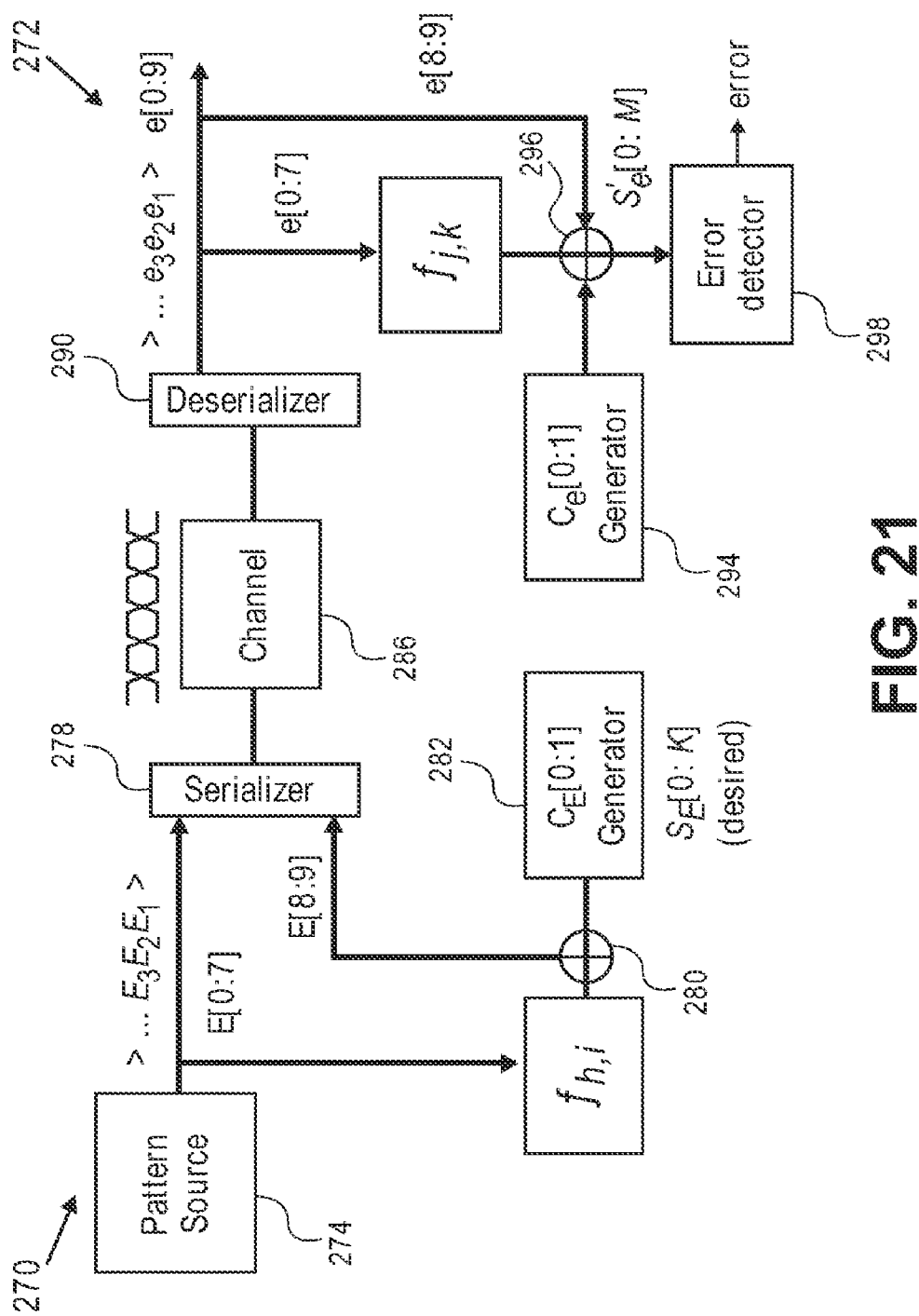
FIGS. 21 and 22 are each a block diagram representation of an interface test system.

FIG. 21 illustrates an interface test system with a transmitter 270 and a receiver 272 which illustrates error detection using test properties. The test circuitry depicted in FIG. 21 is a refinement of that in FIG. 3. The stream of codeword generated from pattern source 274 is test encoded, serialized through serializer 278, and transmitted over a channel 286. The test encoding embeds test properties by the test encoding functions $f_{h,i}$ and $C_E$[0:1] generator through XOR gate 280 as mentioned. At the receiver, the transmitted stream of codewords from deserializer 290 is interpreted and checked against expected class signature sequence. The error is flagged if the error changes class signature sequence or test properties. In the example of FIG. 21, test encoding functions $f_{j,k}$ (which may be the same as or differ than test encoding functions $f_{h,i}$) provide bits $e_8$ and $e_9$ to XOR gate 296. XOR gate 296 also receives the $C_e$[0:1] control signals from $C_e$[0:1] generator 294 and bits e[8:9] and provides signatures S'e [0:M]. Error detector 298 detects errors (for example, differences in actual and expected class signature sequences). FIG. 21 is merely one of various ways in which the transmitters and receivers may be implemented.

Figure 22:
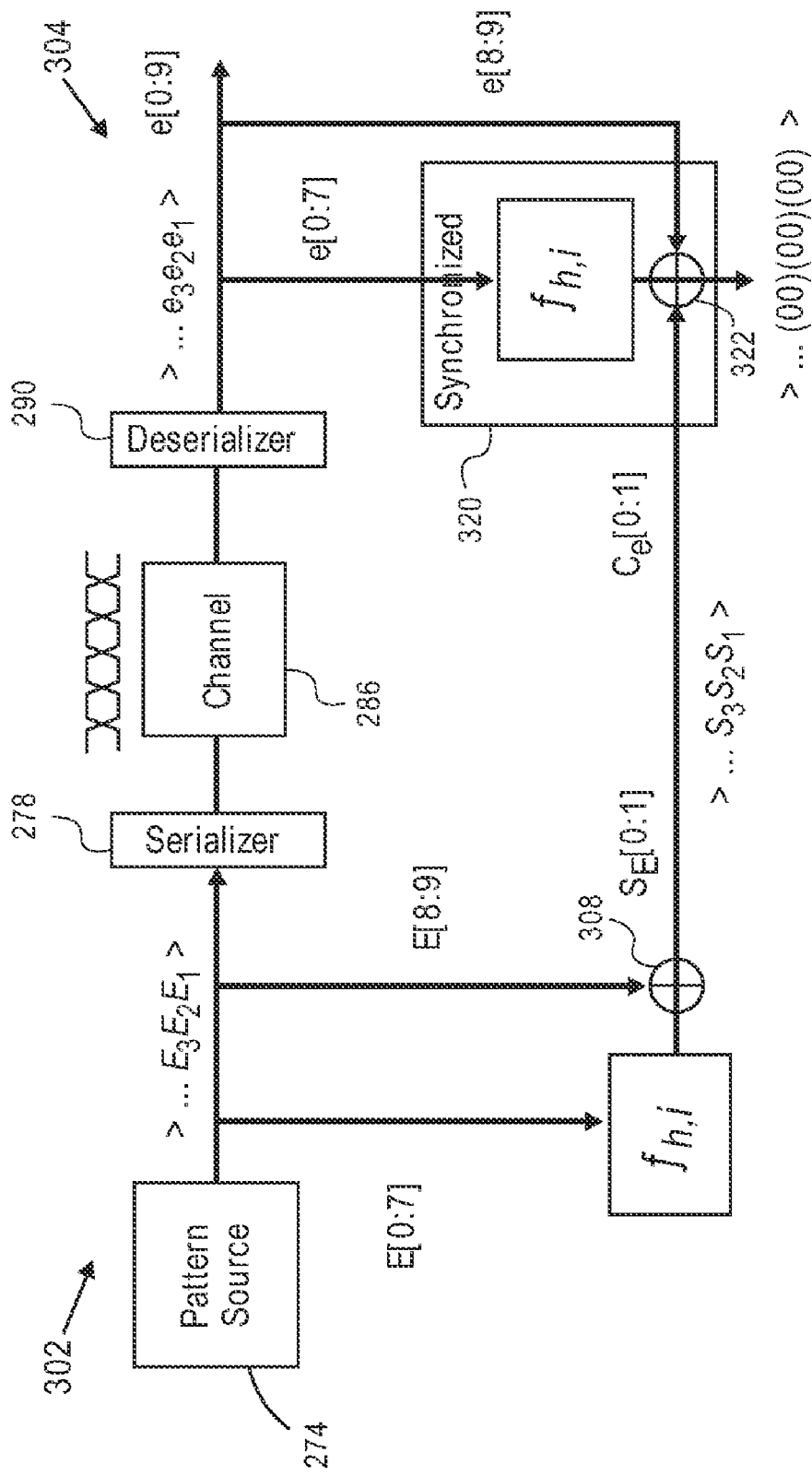

If synchronization between the transmitted codeword and its class signature may be established, as depicted in FIG. 22, the class signature of TX, $S_E$[0:1], may directly be connected to the $C_e$[0:1]. Note test encoding functions at both TX and RX, may be, but are not necessarily the same. FIG. 22 is an illustration of special case where test encoding functions employed at TX and RX are the same. FIG. 22 illustrates a transmitter 302 (including an XOR gate 308 that receives the output of test encoding functions $f_{h,i}$ and bits E[8:9]) and a receiver 304 (including test encoding functions $f_{h,i}$) that is synchronized as shown in block 320. XOR gate 322 receives the $C_e$[0:1], output of $f_{h,i}$, and e[8:9]. Synchronization may be achieved by using commonly known techniques such as a first-in first-out (FIFO). If the path that routes the class signature is faster than the serial path that routes codeword, for example, the class signature may be buffered to tolerate latency. Buffering the class signature may offer a hardware advantage because the size of class signature is significantly smaller than that of codeword. The FIFO may be resided either on-chip or off-chip.

In some embodiments, the test circuitry in FIG. 22 may provide universality and online test capability. Any test patterns with any arbitrary sequences may be used to detect errors without complicating the design of error detector. For example, if TX and RX test encoding functions were synchronized or the same, the resulted seq(S'e[0:1]) is always sequence of zeros. Hence, any errors that result in non-zero class signature may easily be detected. The test circuitry in FIG. 22 may offer online testing capability. Online testing checks the error while the system is in use. It may collect bit-error-rate (BER) information during the normal system operation. The collected BER information, for example, may be used to determine quality of communication channel in field.

Direct generation of test pattern in 10-bit codeword may require DC-balancing. As known in the prior art, DC-balancing ensures the number of 1s and 0s in one or more consecutive codewords is balanced. The DC-balance may reduce both inter-symbol interference (ISI) and electromagnetic emission. It may also help AC-coupling and enable the clock to be recovered from data at the receiver.

The DC-balancing may be considered in test pattern generation in 8-bit data because DC-balancing may be performed by the encoder. Test pattern generation in 10-bit codeword, however, should consider the DC-balancing because it is carried out without an aid of the encoder. If the test patterns were applied to device under test (DUT) from the external tester, the DC-balancing may be carried out offline. Computer program or script may be employed to generate desired DC-balanced test patterns. This is very flexible way of obtaining DC-balanced test patterns but it requires the test patterns to be loaded into the tester. For on-chip generation of test pattern in 10-bit codeword, DC-balancing may be achieved by introducing concept of DC-balance window.

Figure 23:
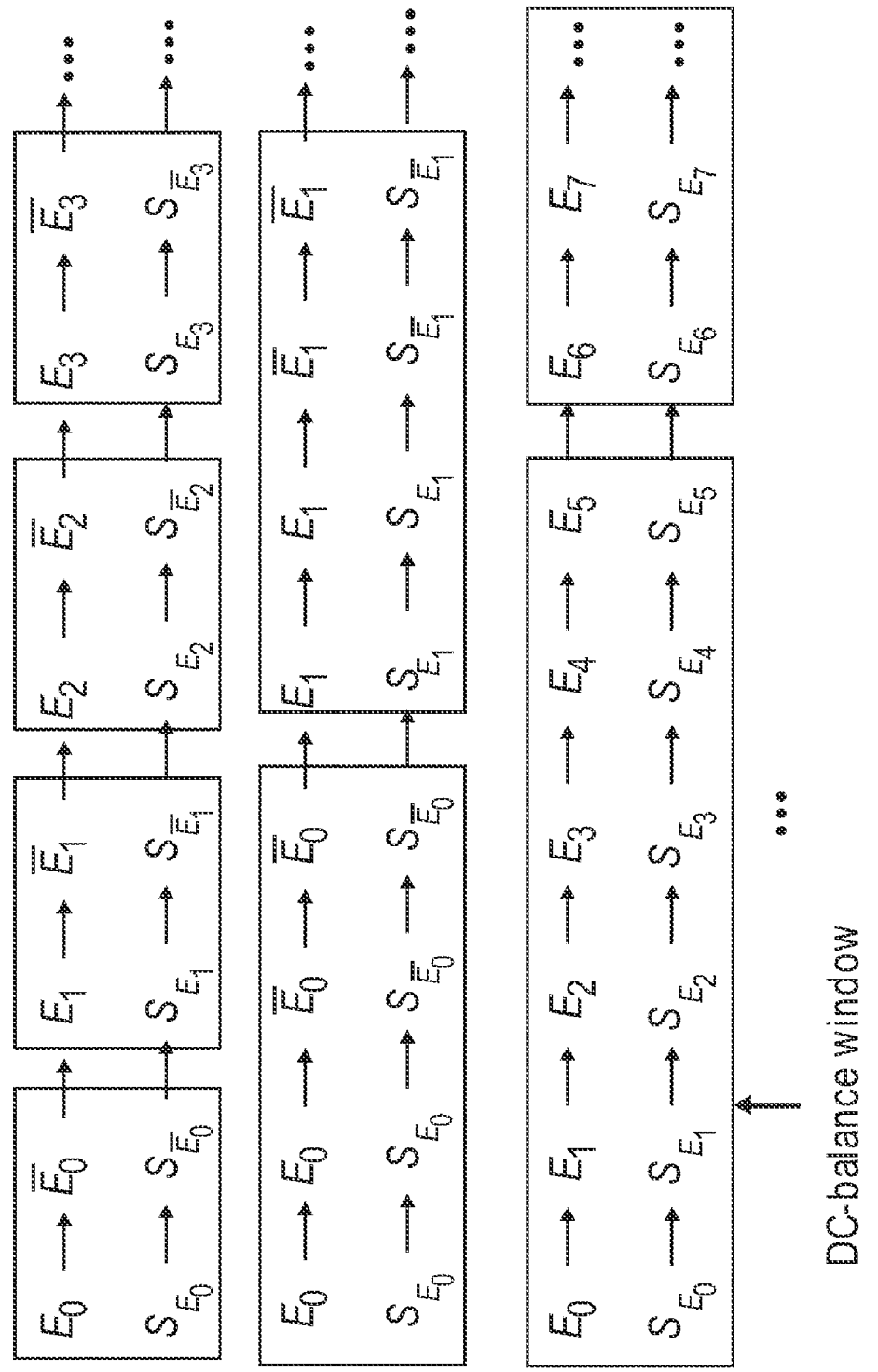
FIG. 23 is a graphical example of a DC-balancing window.

The DC-balancing window is a number of which consecutive codewords are DC-balanced. The size of a window may be determined by the number of codeword included in the window. The DC-balance window may ensure that the number of 1s and 0s included is balanced. An example of DC-balancing window is illustrated in FIG. 23 in which $\overline{E}_i$ denotes a bitwise complement of $E_i$[0:9]. As an example, the class signature of $\overline{E}_i$ may be calculated as shown in FIG. 24. For the mentioned test encoding functions, the class signature of $\overline{E}_i$ may be also a bitwise complement of $S_{E_i}$[0:1].

Figure 25:
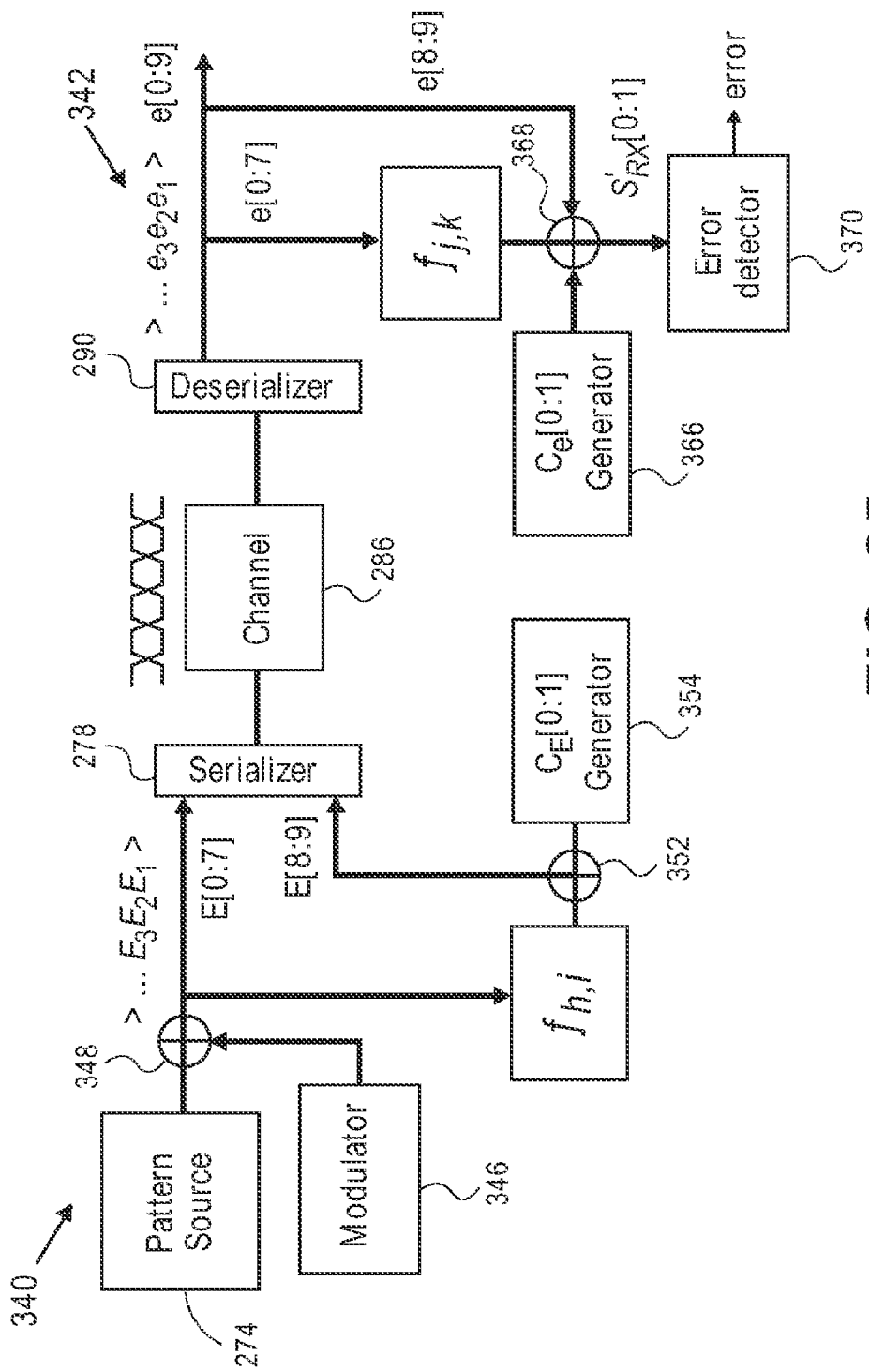
FIG. 25 is a block diagram representation of an interface test system.

Referring to FIG. 25, in some embodiments, generation of test patterns that fit DC-balance window may be carried out by modulating a pattern source 274 through a modulator 346 and an XOR gate 348. As an example, modulator 346 may be an FSM that may individually complement each bit in codeword. The input test encoding functions $f_{h,i}$ may be modulated by modulator 346 the output of test encoding functions $f_{h,i}$ may be modulated by $C_E$[0:1] generator 354 through XOR gate 352. The DC-balance window may be a very efficient way to generate DC-balanced random (or pseudorandom) test patterns which constitute a significant portion of entire HSIO test patterns. The modulator may produce two or more random test vectors out of each random test vector supplied by the pattern source by complementing codeword partially or entirely. Note that complement or partial complement of randomly generated test vector may be considered as a random test vector. Modulation may also provide capability to invert generated test patterns. Such inversion capability may increase a range of patterns to be used in test. For example, if ramp-up or random test patterns may be generated, inversion allows ramp-down and complementary random test patterns may also be generated without significant effort. At receiver 342, XOR gate 368 receives bits e[8:9], outputs of test encoding functions $f_{j,k}$, and outputs of $C_e$[0:1] generator 366 and provides an input to error detector 370 (which may be the same as or different than other error detectors described in this disclosure).

In some embodiments, a hardware efficient implementation of DC-balance window techniques may be accomplished by exploring frequency relationship among on-chip test pattern generator, modulator and $C_E$[0:1] generator. For example, if test patterns with DC-balance window size of 2 are to be generated, frequency of modulator may be twice as fast as that of on-chip pattern generator so that codeword and its complement may be obtained from a single codeword. The $C_E[0:1]$ generator may similarly be operated to modulate the signatures. If larger size DC-balance window is required, the test pattern generator may be slowed down further and the modulator and $C_E[0:1]$ generator may be made fast enough to generate the DC-balance window based on each codeword generated by the on-chip pattern generator.

Figure 26:
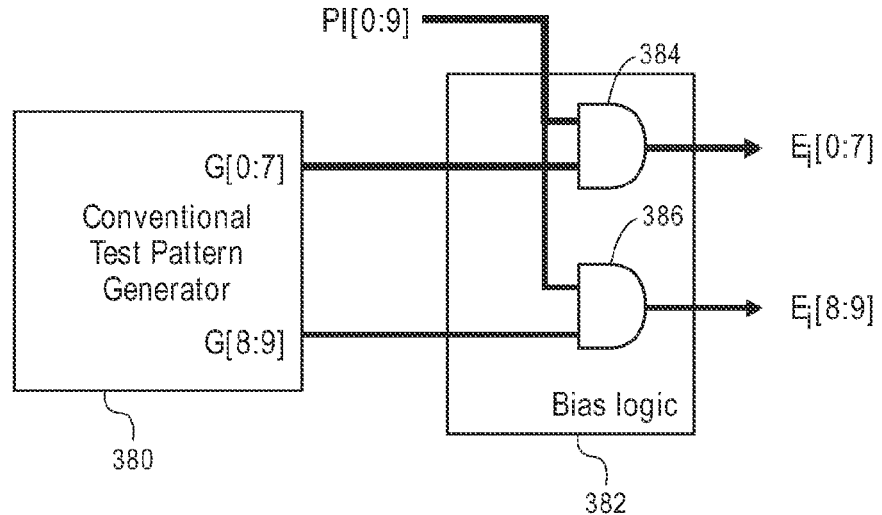
FIG. 26 is a block diagram representation of a test pattern source.

FIG. 26 gives an example of circuitry of an on-chip test pattern source. The test pattern generation unit may be conventional PRBS generator, counter, etc. A conventional test pattern generator 380 provides bits G[0:7] to an AND gate 384 in bias logic 382. AND gate 384 also receives bits PI[0:7] and provides bits Ei[0:7]. Conventional test pattern generator 380 provides bits G[8:9] to an AND gate 386. AND gate 386 also receives bits PI[8:9] and provides bits Ei[8:9]. Some embodiments use the bias logic to constraint the generated test patterns. Such constraints may aid to generate worst case test patterns. By assigning PI[i]=0 for desired i, the minimum number of zeros or ones in the 8-bit data and 10-bit codeword may be controlled. For example, if 7 out of PI[0:9] are set to logical 0, $E_i[0:9]$ contains at least 7 zeros and the inverted $E_i[0:9]$ contains at least 7 ones. Such bias test patterns may worsen the ISI problem and may fail weak ICs faster than unbiased test patterns.

HDMI Test Circuits.

In some embodiments, test circuitry for various HSIO BIST may implement communication test protocols. As an application, test circuitry may be used for TX and RX HDMI devices that employ the TMDS protocol. A main application of HDMI devices is display, such as playing digital television (TV) and digital versatile discs (DVDs). The HDMI is source synchronous and there are red, green and blue (RGB) HSIO channels to process video data.

Figure 27:
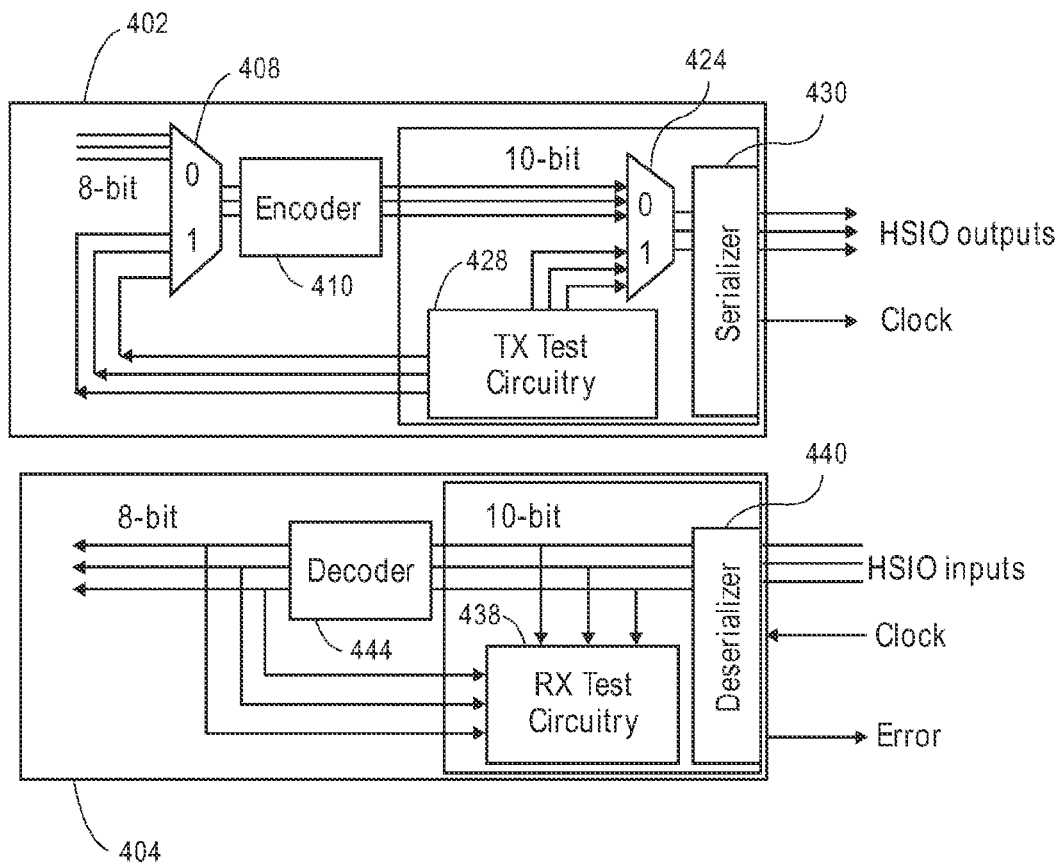
FIG. 27 is a block diagram representation of an interface test system.

Referring to FIG. 27, in a transmitter 402, when multiplexers 408 and 424 are each in a "0" state, a data signal (such as an ordinary non-test signal in ordinary operation) is passed through multiplexer 408, encoded by encoder 410, passed through multiplexer 424, serialized by serializer 430 and provided through HSIO outputs to a channel. When multiplexer 408 is in the "1" state and multiplexer 424 is in the "0" state, a data signal test pattern is provided from TX test circuitry 428 through multiplexer 408 and encoded by encoder 410. The test pattern signal from encoder 410 is provided through multiplexer 424 to serializer 430 to the channel. When multiplexer 424 is in a "1" state, text circuitry 428 provides the test pattern signal directly through multiplexer 424 to serializer 430 and the channel. Receiver 404 (which may be on the same chip or a different chip than transmitter 402) receives signals from the channel through HSIO inputs. The received signals are deserialized through deserializer 440 and provided to RX test circuitry 438 and decoder 444. Decoder 444 provides 8-bit data signals to test circuitry 438 and other parts of a chip including receiver 404. Test circuitry 438 compares the received test properties with expected test properties and determines whether an error has occurred. In some embodiments, an error signal has a first value if there is not an error and a second value if there is an error. In some embodiments, the error signal provides additional information. Various other approaches can be used. The error determination may be accomplished in various ways, examples of which are described in this disclosure. Modifications such as those described in connection with FIG. 5 may be made.

FIG. 27 also illustrates how the test circuitry may be employed to test multiple channels. The TX test circuitry may generate test patterns in both 8-bit data and 10-bit codeword for all RGB channels in parallel and transmit them over the serial interface. The RX test circuitry may monitor the incoming RGB streams of codeword or of data. If an error is detected, the Error signal is flagged. The Error signal may be used to measure bit error rate (BER) and to halt the clock for silicon debug.

In some embodiments of the proposed RX test circuitry, the test patterns in RGB channels need not be the same even if identical test circuitry is employed for each channel. The stream of different codeword may be applied to each channel independently. In conventional PRBS approach, however, it may be difficult to obtain channel independency in the same situation because identical LFSR polynomials may force the same patterns to be applied to all RGB channels. Channel independency may allow a wider range of test patterns to be applied and hence improves testability.

Figure 28:
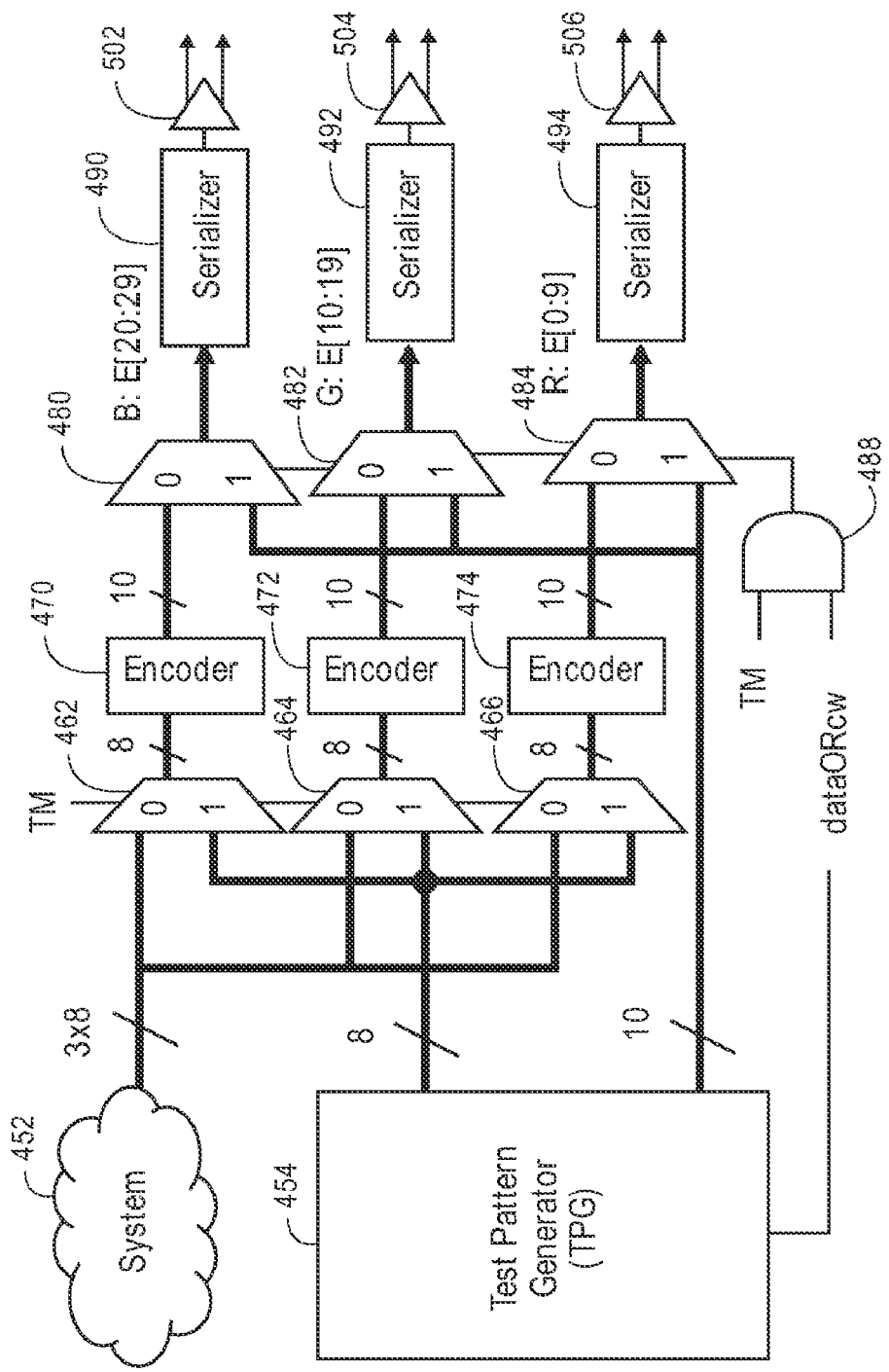
FIGS. 28 and 29 each are a block diagram representation of transmitter circuitry.

Some embodiments of a transmitter are depicted in FIG. 28. As an example, a system 452 provides three groups of 8-bit color data signals to the "0" inputs of multiplexers 462, 464, and 466. A pattern source includes test pattern generator (TPG) 454, which provides 8-bit signals to the "1" inputs of multiplexers 462, 464, and 466. Encoders 470, 472, and 474 encode the outputs of multiplexers 462, 464, and 466 and provide the encoded signals to the "0" inputs of multiplexers 480, 482, and 484. TPG 454 also provides 10-bit encoded signals to the "1" inputs of multiplexers 480, 482, and 484. The RGB encoded outputs of multiplexers 480, 482, and 484 (as shown) are serialized through serializers 490, 492, and 494 and are driven by differential drivers 502, 504, and 506. When test is enabled (TM=1), the test path is set to the pattern generator through MUX. The 8-bit data or 10-bit codeword generation is selected by the signal dataORcw. If the dataORcw=0 or 1, the test pattern generator generates 8-bit data or 10-bit codeword respectively. If 8-bit data is selected, the 8-bit data is routed to encoder and the encoded 10-bit is transmitted via the serializer. Otherwise, generated 10-bit codeword is directly routed to the serializer. The test pattern generator may include a test pattern source and test property generation unit. The test pattern generator may be shared among the RGB channels. The test property generation unit may include modulator, $C_E[0:1]$ generator, and test encoding functions.

Figure 29:
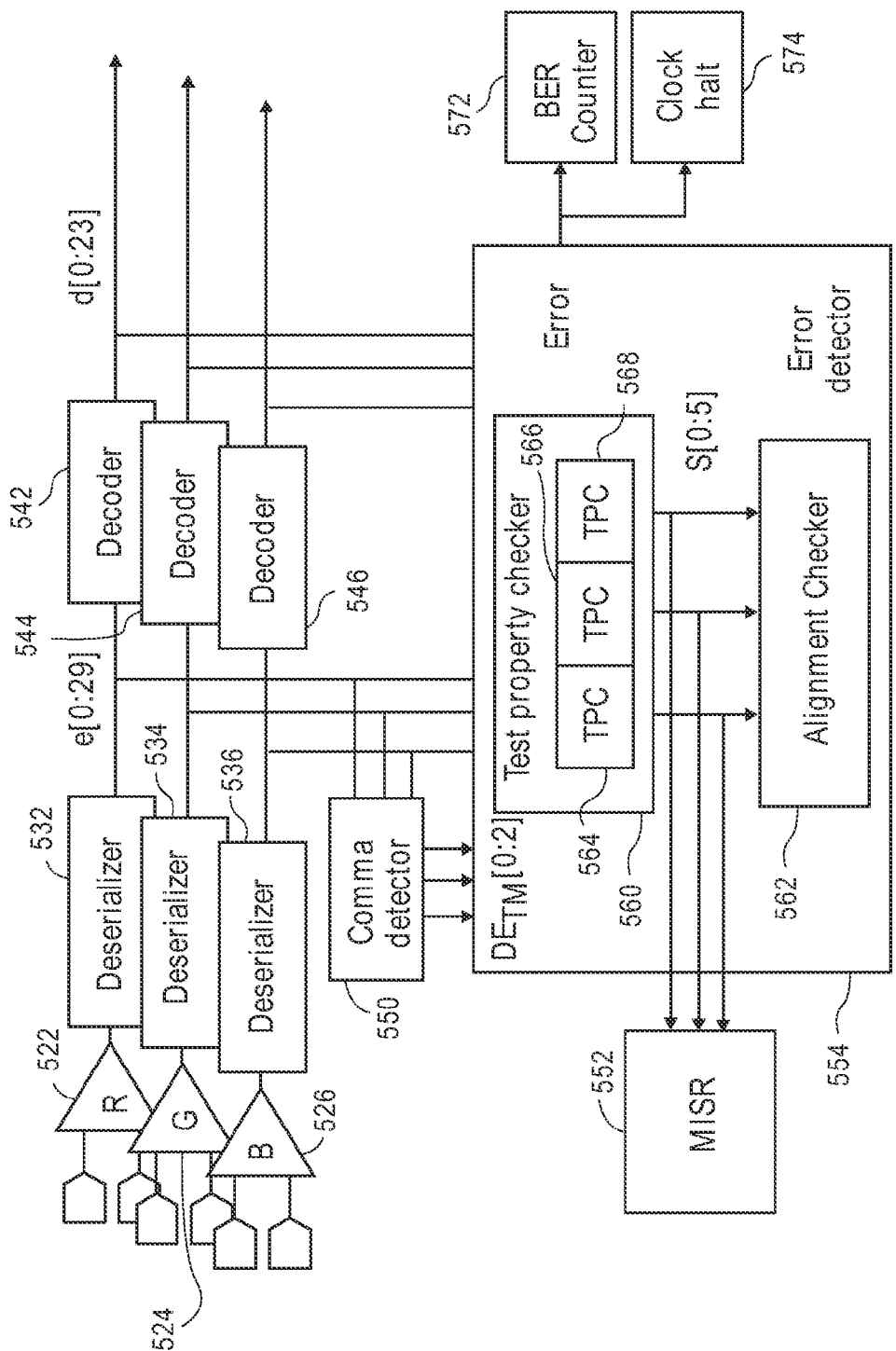

FIG. 29 illustrates some embodiments of a receiver for the transmitters of FIG. 28. FIG. 28 includes RGB receivers 522, 524, and 526 the outputs of which are deserialized through deserializers 532, 534, and 536 to provide signals e[0:29]. The streams are decoded by decoders 542, 544, and 546 to provide decoded signals d[0:23]. Signals e[0:29] are provided to comma detector 550. A predefined or more number of consecutive command characters, say $K_0^*$, may be used to synchronize the beginning of test pattern. For example, if comma detector 550 detects the $K_0^*$, the data enable ($DE_{TM}$) signal is asserted to logical 0. Otherwise it is set to logical 1. In the example, a single command character is considered as a part of test pattern. Thus, some errors involving comma characters may be detected. Error detector 554 includes test property checker 560 including test property sub-checkers 564, 566, and 568, which provide signals to multiple input signature register (MISR) 552 and alignment checker 562, described below. The stream of received codeword in each RGB channel is checked by test property checker 560, which may include the mentioned test encoding functions, $C_e[0:1]$ generator and error detector. The detected errors may be used to measure BER (counter 572) and to halt the clock through circuitry 574 for silicon debug.

Figure 30:
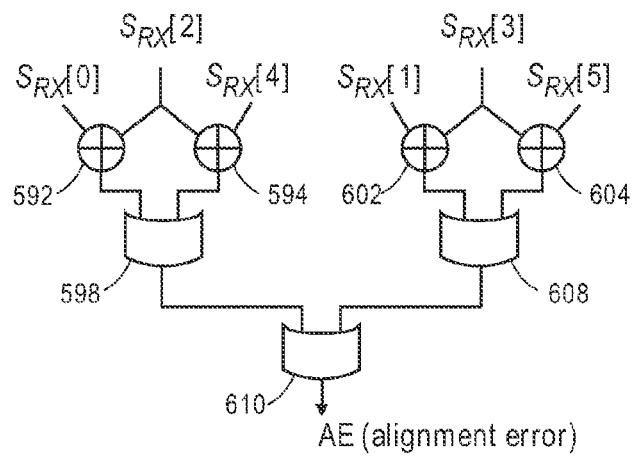
FIG. 30 is a block diagram representation of an alignment checker.

In some embodiments, if the received RGB 8-bit data or 10-bit codeword are synchronized, the received data may be checked against each other. In some embodiments, the class signatures of RGB channels are compared to detect alignment errors in alignment checker 562 (shown in FIG. 30) to detect alignment errors in RGB channels. In some embodiments, to be error-free, all class signatures must be the same. If any of class signatures is different, error is flagged. In some embodiments, an RGB alignment checker using the class signatures may lead to a simpler hardware solution than using data or codeword. Referring to FIG. 30, in some embodiments, the outputs of XOR gates 592 and 594 are ORed through OR gate 598, and the outputs of XOR gates 602 and 604 are ORed through OR gate 608. OR gate 610 provides an alignment error.

Figure 31:
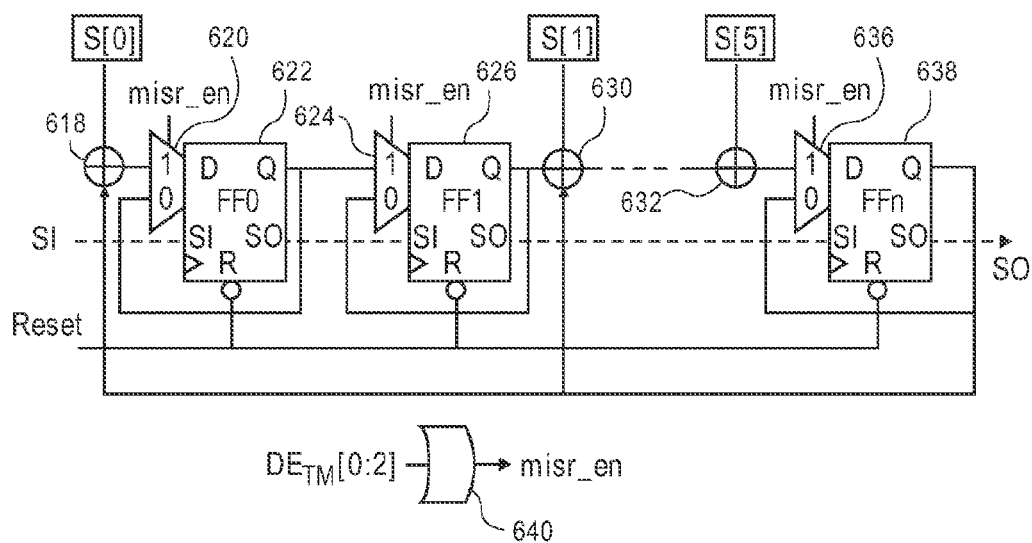
FIG. 31 is a block diagram representation of a multiple input signature register.

In some embodiments, multiple input signature register (MISR) 552 may also be used to detect errors. An example of MISR 552 is illustrated in FIG. 31 in which XOR gates 618, 630, and 632 receive signatures S[0], S[1], and S[5] and the Q output of flip-flop 638. The outputs of XOR gates 618, 630, and 632 are provided to "1" inputs of multiplexers 620, 624, and 636, controlled by a misr_en signal (from OR-gate 640). The "0" inputs of multiplexers 620, 624, and 636 receive the outputs of flip-flops 622, 626, and 638, respectively. Scan in (SI) and scan out (SO) signals are also included. The MISR may be a LFSR that accepts external inputs. A MISR with a LFSR has been used in the prior art to compact a test response of circuit tests. The same MISR, however, may also be applied to HSIO test for compaction. In some embodiments, the MISR may skip the prefixed control characters and compact only test data. If the designated control characters are detected, the signal misr_en is set to logical 1 and maintains the previous state. This may ensure that the content of MISR at the end of compaction called signature may be made deterministic. In some embodiments, the expected signature of MISR may be obtained by simulation.

Modulo-K Partition.

Embodiments of the invention are not restricted to generating two bits for the codeword, using two signatures, using two control signals, etc., but rather may be generalized. However, the number could be other than two. For example, the number could be one or three. The following gives examples of a modulo-3 partition involving generating three bits for the codeword, using three signatures, using three control signals, etc.

In some embodiments, test circuitry can handle $2^{17}$ test encoded 20-bit codewords of E[19:0] and $2^{17}$ fixed 20-bit codewords patterns. The may be useful in detecting errors that change a consistent codeword into an inconsistent codeword. In some embodiments, a burst error of e[m:n] can be detected, with the possible exception of some cases for |m−n|=2fk, k>0 and where f denotes a number of encoding function used. Other features mentioned above such as byte-misalignment may also be used. Interpretation of n-bit data may involve an n-tuple that carries input & output functions such as e[16:0]= (i2, i1, i3, i2, o1, i3, i2, i1, i3, o2, i1, i3, i2, i1, o3, i2, i1) as an example.

Figure 33:
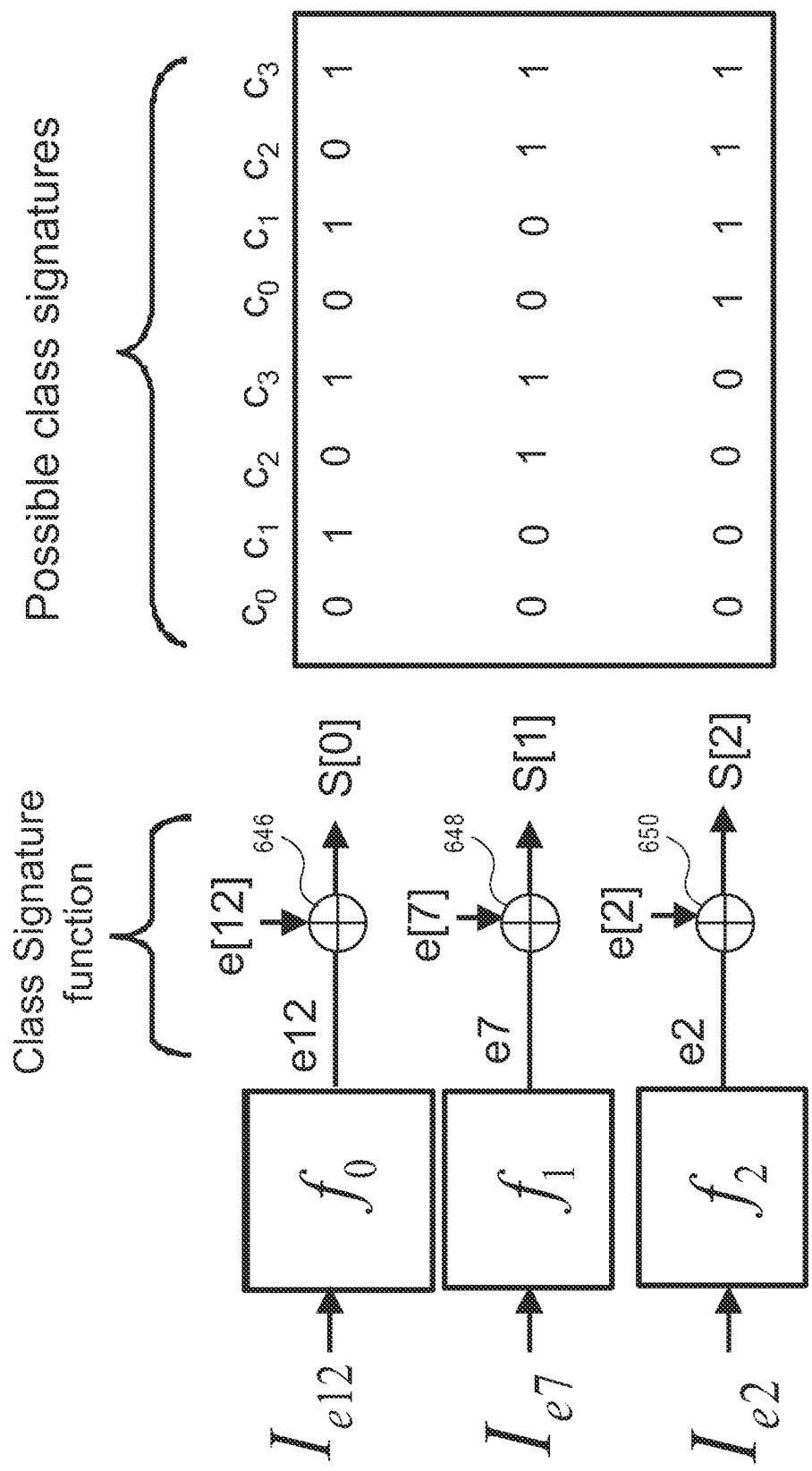
FIG. 33 is a block diagram and graphical representation of test encoding functions, class signature functions, and class signatures.
Figures 34, 35:
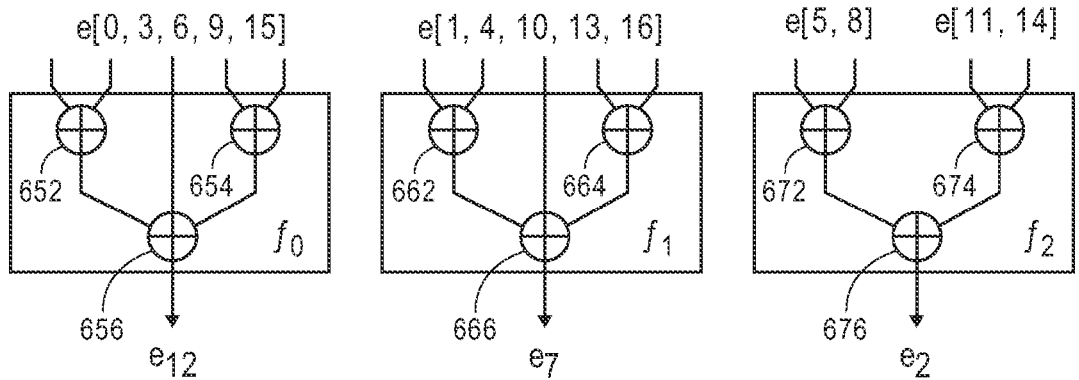
FIG. 34 is a block diagram representation of test encoding functions.
FIG. 35 illustrates examples of equations for signature functions.

FIG. 32 gives possible definitions for inputs signals $I_{e12}$, $I_{e7}$, and $I_{e2}$ for the functions that produce the bits 12, 7, and 2. In FIG. 33, test encoding functions $f_0, f_1$, and $f_2$ provided bits e12, e7, and e2 in response to signals $I_{e12}$, $I_{e7}$, and $I_{e2}$. XOR gates 646, 648, and 650 are class signature functions that provide signatures S[0], S[1], and S[2] in response to e12 and e[12], e7 and e[7], and e2 and 2[2]. Possible class signatures are also shown. FIG. 34 gives examples of test encoding functions $f_0, f_1$, and $f_2$. In FIG. 34, $I_{e12}$ includes bits 0, 3, 6, 9, and 15, $I_{e7}$ includes bits 1, 4, 10, 13, and 16, and $I_{e2}$ includes bits 5, 8, 11, and 14. In function $f_0$, XOR gates 652 and 654 receive bits e[0, 3, 9, and 15] and XOR gate 656 receives the outputs of XOR gates 652 and 654 and bit e[6]. In function $f_1$, XOR gates 662 and 664 receive bits e[1, 4, 13, and 16] and XOR gate 666 receives the outputs of XOR gates 662 and 664 and bit e[10]. In function $f_2$, XOR gates 672 and 674 receive bits e[5, 8, 11, and 14] and XOR gate 676 receives the outputs of XOR gates 672 and 674. FIG. 35 gives details regarding signature functions S[2:0] in some embodiments.

Figure 36:
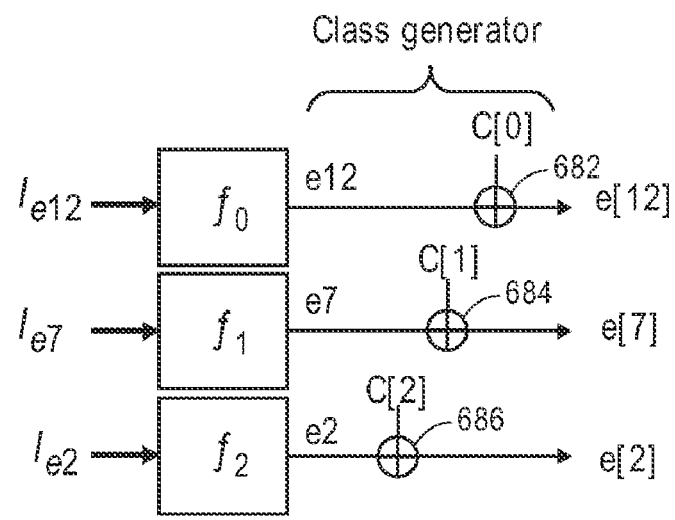
FIG. 36 is a block diagram representation of test encoding functions and class generating functions.

In some embodiments, there may be eight groups of signature classes of e[16:0]. Class functions may partition entire codewords (or data) into $2^N$ sets of codewords, where N denotes the number of encoding functions. As an example: e[16:0]=(i1, i2, i1, i2, o1, i2, i1, i2, i1, o2, i1, i2, i1, i2, i1, i2, i1). Eight class signatures S[0:2] may be 000, 001, 010, ... 111 for $2^{14}$ codewords (compare with FIG. 10). FIG. 36 illustrates XOR gates 682, 684, and 686 that may be used in connection with embedding S[2:0] into a stream. As examples, $C[0]=f_0(I_{e12}) \oplus e[12]=S[0]$, $C[1]=f_1(I_{e7}) \oplus e[7]=S[1]$, $C[2]=f_2(I_{e2}) \oplus e[2]=S[2]$. The information above provided in connection with FIG. 13 may be replaced with S[2:0].

Figure 37:
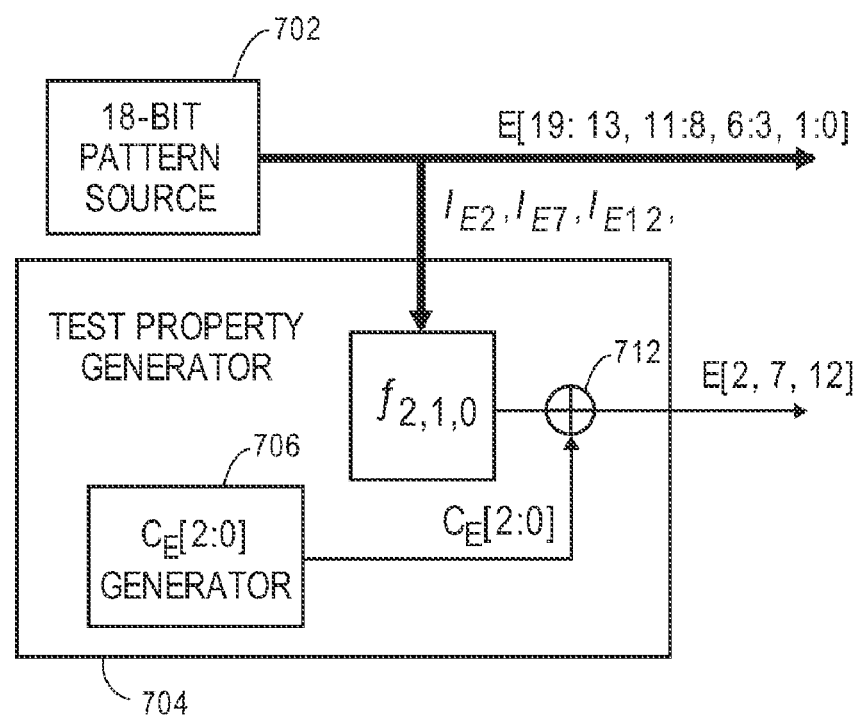
FIG. 37 is a block diagram representation of a pattern source and test property generator.
Figure 38:
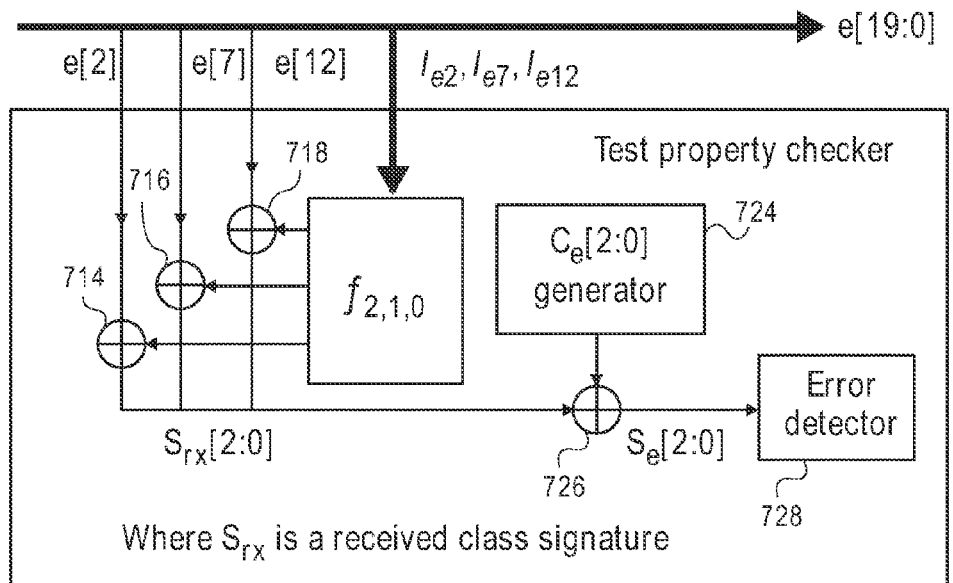
FIG. 38 is a block diagram representation of a test property checker.

Referring to FIG. 37, in some embodiments, an 18-bit pattern source 702 provides a bit stream from which signals $I_{e2}$, $I_{e7}$, and $I_{e12}$ are provided to test encoding functions $f_0, f_1$ and $f_2$ in test property generator 704. The outputs of test encoding functions $f_0, f_1$, and $f_2$ and the output of $C_E[2:0]$ generator 706 are provided to XOR gates 712 to provide signals E[2, 7, 12]. Referring to FIG. 38, in some embodiments, signals $I_{e2}$, $I_{e7}$, and $I_{e12}$ are provided to test encoding functions $f_0, f_1$, and $f_2$, the outputs of which are XORed with gates 714, 716, and 718 with bits e[2], e[7], e[12] to produce $S_{rx}[2:0]$. $S_{rx}[2:0]$ and the control signals of $C_e[2:0]$ is XORed in gates 726 to produce $S_e[2:0]$ from which errors are detected by error detector 728.

In some embodiments, in class generating functions in the receiver, $S_e[i]=C_{RX}[i] \oplus Srx[i]$, where i is in the set {2, 1, 0}, and $S_e[i]=S_{rx}[i]$ if $C_{RX}[i]=0$, and is the inverse of $S_{rx}[i]$ otherwise.

Figure 39:
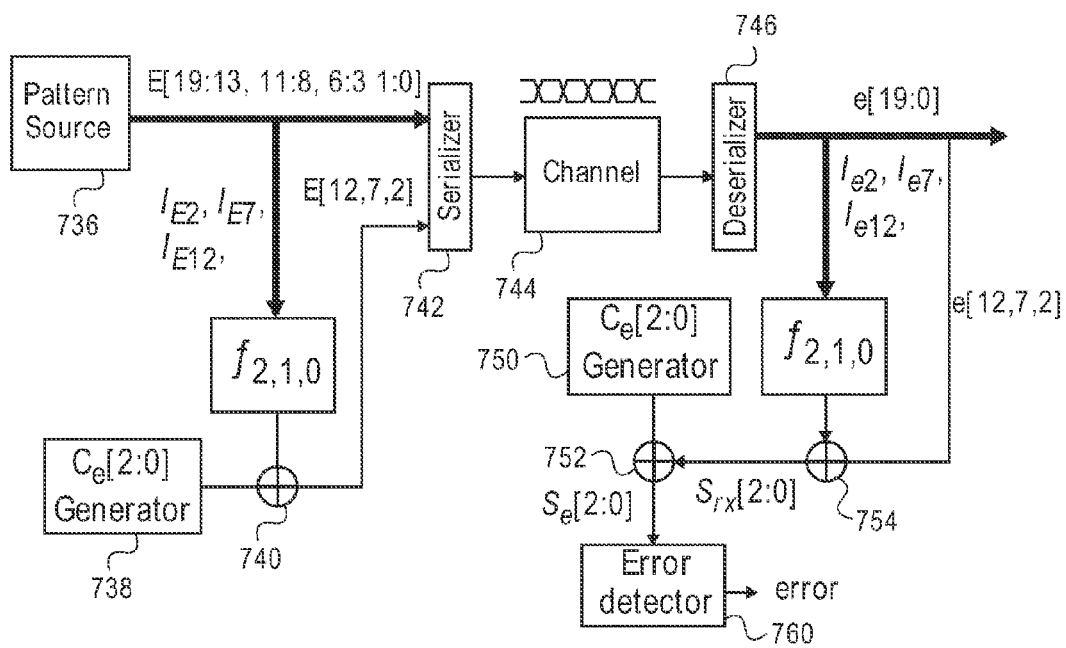
FIG. 39 is a block diagram representation of an interface test system.

Referring to FIG. 39, a transmitter includes pattern source 736, test encoding functions $f_0, f_1$, and $f_2$, XOR gates 740, $C_e[2:0]$ generator 738, and serializer 742 coupled to channel 744. A receiver includes deserializer 746, test encoding functions $f_0, f_1$, and $f_2$, $C_e[2:0]$ generator 750, XOR gates 752, and error detector 760. $S_{rx}[2:0]$ is output from XOR gate 754 and $S_e[2:0]$ is output from XOR gate 752. (Note the change in terminology, but not necessarily change in meaning, as compared to FIG. 19.)

FIGS. 40 and 41 provide examples of equations for $S_e$, $C_{RX}$, and $S_{RX}$.

Figure 42:
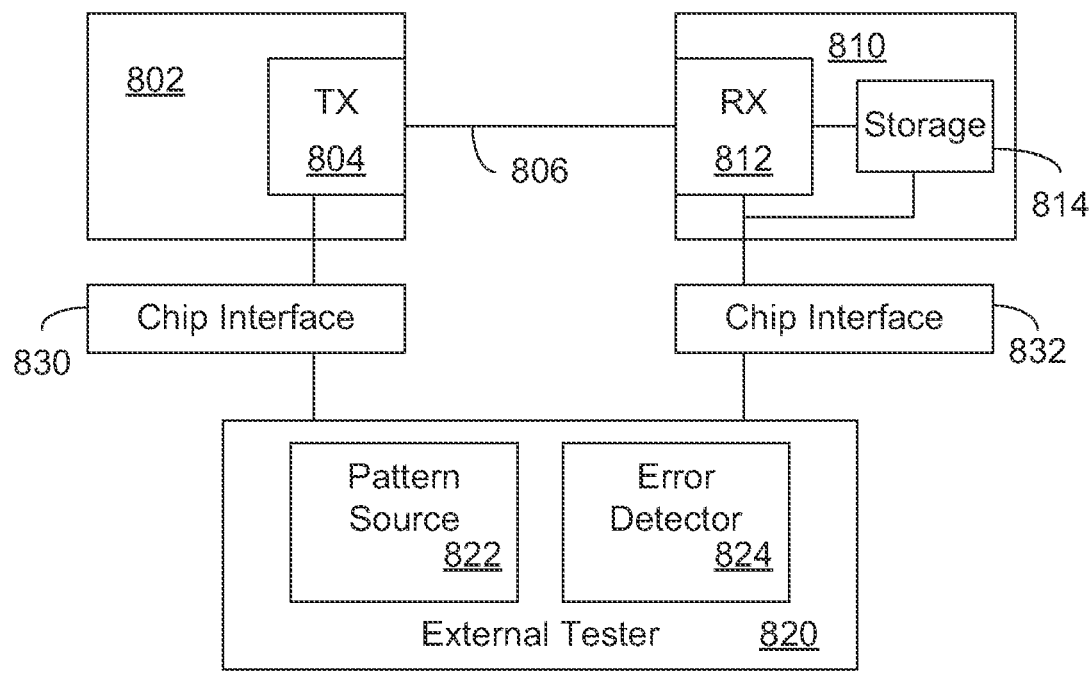
FIGS. 42 and 43 are each block diagram representations of test systems.
Figure 43:
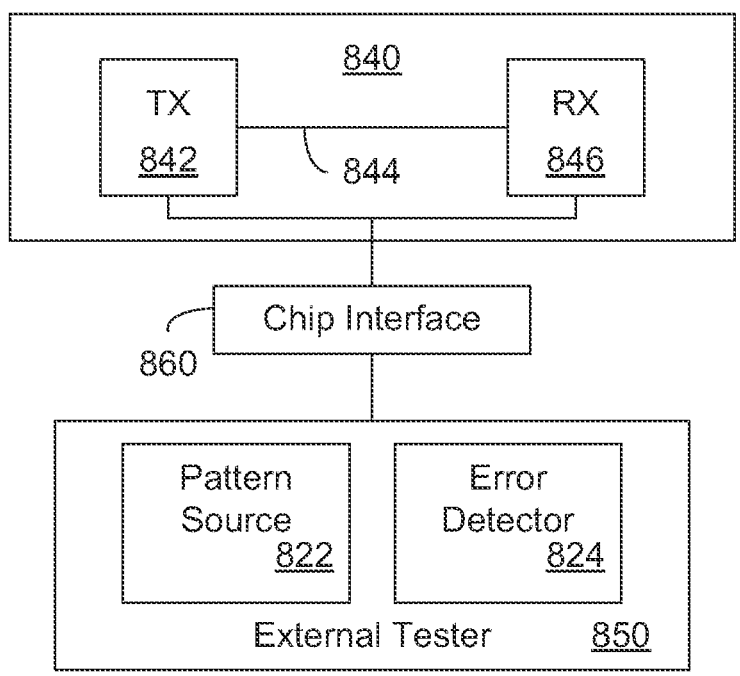

FIG. 42 shows a system with an integrated circuit chip 802 with a transmitter 804 coupled through a channel 806 to a receiver 812 in a chip 810. A storage circuit 814 may hold signals for later analysis. An external tester 820 including a pattern source 822 and an error detector 824 interfaces to chip 802 through a chip interface 830 and interfaces to chip 810 through chip interface 832. Pattern source 822 may be the same as or similar to other pattern sources in the disclosure or may assist another pattern source in chip 804. Error detector 824 may be the same as or similar to other error detectors in the disclosure or may assist another error detector in chip 810. In some embodiments, the pattern source and error detector are not in the test equipment. FIG. 43 illustrates a system similar to that of FIG. 42 except that transmitter 842, channel 844, and receiver 846 are in the same chip 840. External tester 850 interfaces with chip 840 through chip interface 860.

Transmitters 804 and 842 and receivers 812 and 846 are examples of transmitters and receivers described in this disclosure. Chip 840 may include storage circuitry like circuitry 814. Note that in some embodiments, the pattern is generator in the chip with the transmitter, and any errors are detected in an error detector in the chip with the receiver. In such embodiments, an external tester may merely receive results of the internal error detector.

ADDITIONAL INFORMATION AND EMBODIMENTS

In some embodiments, there is not a test encoding function in the transmitter but there is at least one test encoding function in a corresponding receiver.

Aspects of some embodiments can be appreciated by comparing them with a prior art checksum used in some communication protocols. The checksum is sometimes used to check errors in the received data. The checksum, however, is not a part of data but is separately included in the packet. The class signature, on the other hand, could be included as part of the codeword or along with the codeword over a channel, but does not have to be included in the codeword or on the channel. In some embodiments, the class signature is an implied concept in the codeword. The functional interpretation of codewords can extract the class signature information from a codeword. Thus, if the sender can transmit seq(test patterns) with a known property (for example, without appending any redundant bits to check errors), the RX test circuitry in the receiver can check errors captured in a stream of the received codewords. Examples of such patterns can include fixed patterns and patterns generated based on a DC-balance window specification. An example of a fixed pattern can be (1111100000→1100110011→0000110011→0000011111)*.

Some of the embodiments described above involve HSIO test circuits that may be applied to various encoding techniques. Compared to conventional PRBS BIST approaches, some embodiments may provide a richer set of test patterns and offer greater flexibility in test development. The proposed test circuitry may accommodate various pattern sources including PRBS patterns and externally supplied patterns from the tester. This may improve quality goals and reduce engineering time in test development.

In some embodiments, communication protocols may encode signals on channels to meet performance requirements and to overcome physical obstacles such as noises so as to ensure that what was transmitted is safely received. Since different protocols may target different physical mediums and different performance criteria, it is not always convenient to develop test techniques using the employed protocols. As an example, interoperability during test may be important in system on a chip (SOC) design testing where various PHY cores that employ different protocols are resided on the same chip. If all cores employ protocol insensitive BIST, any TX cores may be used to test any RX cores and vise versa regardless of protocols they employ.

Some embodiments may be used in connection with various encoding techniques, examples including High-Definition Multimedia Interface (HDMI), Serial ATA, PCI Express etc and may provide a rich set of test patterns for both test and silicon debug. In some embodiments, since the proposed test circuitry is independent of PRBS polynomials, any patterns may be applied to a DUT externally from any pattern sources—although in other embodiments, there are some restrictions on usable patterns.

The blocks and circuits shown above (such as a pattern source, $C_e$ generator, error detector, XOR gate, test encoding functions, class signature functions, and modulators) may be implemented through circuitry dedicated for only particular purposes, general circuitry used for different purposes, or circuitry in combination with software or firmware. Various kinds of signaling may be used including differential and signal ended signaling. The voltages may be either high or low, or more than two levels. The signals may be in the forms of "eyes" or in some other form.

As used herein, the term "embodiment" refers to an implementation that is used in connection with some aspect of the inventions. Reference in the specification to "an embodiment," "one embodiment," "some embodiments," or "other embodiments" means that a particular feature, circuitry, or characteristic described in connection with the embodiments is included in at least some embodiments, but not necessarily all embodiments. Different references to "some embodiments" do not necessarily refer to the same "some embodiments."

When it is said the element "A" is coupled to element "B," element A may be directly coupled to element B or be indirectly coupled through, for example, element C. When the specification or claims state that a component, feature, circuit, structure, process, or characteristic A is in response to a component, feature, circuit, structure, process, or characteristic B, it merely means that A is at least partially responsive to B (but may also be responsive to C, or B and C at the same time). That is, when it is said A is in response to B, A could be in response to B and C at the same time. Likewise, when it is said that A causes B, A is at least a partial cause of B, but there could be other causes of B either separately or in combination with A.

If the specification states a component, feature, structure, circuitry, or characteristic "may", "might", or "could" be included, that particular component, feature, circuitry, or characteristic is not required to be included. If the specification or claim refers to "a" structure, that does not mean there is only one of the structure.

While the invention has been described in terms of several embodiments, the invention should not limited to only those embodiments described, but may be practiced with modification and alteration within the spirit and scope of the appended claims. The description is thus to be regarded as illustrative instead of limiting.

What is claimed is:

1. An apparatus comprising:

conductors to transmit signals; and a transmitter coupled with the conductors including transmitter test circuitry, an encoder, and one or more multiplexers to:

obtain a set of test properties for testing of an interface between the apparatus and a receiving apparatus to define types of test patterns to be transmitted to the receiving apparatus, the test properties including a sequence of class signatures, the class signatures representing a partition of all possible codewords into subsets;

embed the set of test properties in test pattern signals using the one or more multiplexers, the test pattern signals being encoded by the encoder, wherein the test pattern signals includes a sequential pattern of codewords that are modified by the transmitter test circuitry in order to embed the test properties in the codewords, and transmit the test pattern signals with the embedded test properties to the conductors for transmission to the receiving apparatus;

wherein the transmitter test circuitry further includes:
test encoding functions to provide encoded bits in response to bits from a stream of signals; and
class generating functions to provide the sequence of class signatures in response to the encoded bits and control signals.

2. The apparatus of claim 1, wherein the bits from the stream of signals are from a first group of positions of signal sections in the stream of signals and the sequences of class signatures are inserted into a second group of positions in the signal sections.

3. The apparatus of claim 2, wherein the signal sections are codewords.

4. The apparatus of claim 2, wherein the signal sections are data sections.

5. The apparatus of claim 1, wherein at least one of the test encoding functions includes a gate to receive a configuration control bit to provide additional test encoding possibilities.

6. The apparatus of claim 1, wherein the test encoding functions and the class generating functions each include exclusive-OR gates.

7. The apparatus of claim 1, wherein the transmitter test circuitry further includes a pattern source to provide the stream of signals and a control signal generator to generate the control signals.

8. The apparatus of claim 4, wherein the class signatures are inserted into the data sections.

9. The apparatus of claim 1, wherein the transmitter test circuitry includes a pattern source and a modulator to modulate an output of the pattern source which is used in creating the test pattern signals.

10. The apparatus of claim 1, wherein the embedded test properties are protocol insensitive.

11. The apparatus of claim 1, wherein a set of test pattern signals includes one or more control characters for identification of the set.

12. An apparatus comprising:
conductors to carry test pattern signals from a transmitting apparatus, the test pattern signals having test properties that have been embedded;
a decoder to receive and decode the test pattern signals with embedded test properties; and
receiver test circuitry to:
receive the test pattern signals with embedded test properties, the test properties including a sequence of class signatures, the class signatures representing a partition of all possible codewords into subsets, the test properties defining types of test patterns to be transmitted,
extract the embedded test properties from the test pattern signals, the test pattern signal including a sequential pattern of codewords that have been modified by transmitter test circuitry in order to embed the test properties in the codewords, and
determine whether the extracted test properties match a set of expected test properties to determine whether one or more errors have occurred;
wherein the receiver test circuitry includes:
test encoding functions to provide encoded signals in response to bits from a first group of positions of signal sections of the test pattern signals, and
circuitry to create expected sequences of class signatures in response to the encoded signals and control signals, the expected sequences of class signatures being used in determining whether the extracted test properties match the expected test properties.

13. The apparatus of claim 12, further comprising:
a control bit generator to generate the control signals; and
circuitry to provide modified sequences of class signatures in response to the expected sequences of class signatures and the control signals;
wherein the modified sequences of class signatures are used in determining whether the extracted test properties match the expected test properties.

14. The apparatus of claim 12, wherein the receiver test circuitry includes an alignment checker to check for alignment errors, wherein the alignment checker receives class signatures.

15. The apparatus of claim 12, wherein the receiver test circuitry includes a multiple input signature register (MISR) for use in detecting errors.

16. The apparatus of claim 12, wherein the receiver test circuitry has circuitry to synchronize received codewords in the test pattern signals with their class signatures.

17. The apparatus of claim 12, wherein the embedded test properties and expected test properties are protocol insensitive.

18. A system comprising:
a channel;
a transmitter coupled with the channel including transmitter test circuitry, an encoder, and one or more multiplexers to:
obtain a set of test properties for testing of the channel, the test properties including a sequence of class signatures, the class signatures representing a partition of all possible codewords into subsets, the test properties defining types of test patterns that may be transmitted to a receiver,
embed the set of test properties in test pattern signals using the one or more multiplexers, the test pattern signals being encoded by the encoder, wherein the test pattern signals includes a sequential pattern of codewords that are modified by the transmitter test circuitry in order to embed the test properties in the codewords, and
transmit the test pattern signals with the embedded test properties to the channel, the transmitter test circuitry further including test encoding functions to provide encoded bits in response to bits from a stream of signals and class generating functions to provide the sequence of class signatures in response to the encoded bits and control signals; and
a receiver coupled with the channel including:
a decoder to receive and decode the test pattern signals with embedded test properties; and
receiver test circuitry coupled to the channel to:
receive the test pattern signals with embedded test properties,
extract the embedded test properties from the test pattern signals, and
determine whether the extracted test properties match a set of expected test properties to determine whether one or more errors have occurred,
wherein the receiver test circuitry includes:
test encoding functions to provide encoded signals in response to bits from a first group of positions of signal sections of the test pattern signals, and
circuitry to create expected sequences of class signatures in response to the encoded signals and control signals, the expected sequences of class signatures being used in determining whether the extracted test properties match the expected test properties.

19. The system of claim 18, wherein the transmitter is in a first chip and the receiver test circuitry is in a second chip, and wherein the channel is coupled to the transmitter through internal conductors.

20. The system of claim 18, wherein the test pattern signals change form between the channel and the receiver test circuitry.

21. The system of claim 18, wherein the transmitter test circuitry is decoupled operationally from the receiver test circuitry.

22. The system of claim 18, wherein the embedded test properties and expected test properties are protocol insensitive.

* * * * *